United States Patent
Yang

(10) Patent No.: US 12,204,293 B2
(45) Date of Patent: Jan. 21, 2025

(54) PRODUCTION EQUIPMENT FOR PERFORMING CONTROL PARAMETER SETTING AND QUALITY DETERMINATION

(71) Applicant: LG INNOTEK CO., LTD., Seoul (KR)

(72) Inventor: Doo Young Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 62 days.

(21) Appl. No.: 17/921,699

(22) PCT Filed: Nov. 25, 2020

(86) PCT No.: PCT/KR2020/016786
§ 371 (c)(1),
(2) Date: Oct. 27, 2022

(87) PCT Pub. No.: WO2021/221258
PCT Pub. Date: Nov. 4, 2021

(65) Prior Publication Data
US 2023/0161300 A1    May 25, 2023

(30) Foreign Application Priority Data

Apr. 28, 2020    (KR) .................... 10-2020-0051282
Apr. 28, 2020    (KR) .................... 10-2020-0051283

(51) Int. Cl.
*G05B 11/42*    (2006.01)
*G05B 19/4062*    (2006.01)
*G06F 17/14*    (2006.01)

(52) U.S. Cl.
CPC .......... *G05B 11/42* (2013.01); *G05B 19/4062* (2013.01); *G06F 17/142* (2013.01)

(58) Field of Classification Search
CPC .. G05B 11/42; G05B 19/4062; G05B 13/024; G05B 19/04; G05B 23/02; G06F 17/142
(Continued)

(56) References Cited

U.S. PATENT DOCUMENTS 7,190,144 B2 * 3/2007 Huang .................... B41M 5/26
                                                    318/636
7,619,379 B2 * 11/2009 Chen .................. H02P 23/0004
                                                    318/275
(Continued)

FOREIGN PATENT DOCUMENTS

CN        101241150        8/2008
CN        106802436        6/2017
(Continued)

OTHER PUBLICATIONS

International Search Report dated Feb. 26, 2021 issued in Application No. PCT/KR2020/016786.
(Continued)

*Primary Examiner* — David Luo
(74) *Attorney, Agent, or Firm* — KED & ASSOCIATES, LLP

(57) ABSTRACT

Production equipment according to an embodiment of the present invention, comprises: a frequency response analysis unit for transmitting a sine wave of a variable frequency to a controller connected to a load, receiving, from the controller, a sensing current for sensing a current output from the load to which the sine wave has been applied, and analyzing the received sensing current; and a processing unit for receiving, from the frequency response analysis unit, a result of analyzing the sensing current to thereby perform a quality determination of the controller or calculate a control parameter of the controller to transmit the result to the controller.

16 Claims, 15 Drawing Sheets

(58) Field of Classification Search
USPC .................................. 318/16, 807, 767, 727
See application file for complete search history.

(56) References Cited

U.S. PATENT DOCUMENTS

| | | | | |
|---|---|---|---|---|
| 7,884,561 B2* | 2/2011 | Peng | ......................... | H02P 6/08 |
| | | | | 318/400.06 |
| 8,214,063 B2* | 7/2012 | Ellis | ..................... | G05B 13/042 |
| | | | | 700/39 |
| 10,720,868 B2* | 7/2020 | Tanaka | .................... | H02P 21/16 |
| 2011/0074330 A1 | 3/2011 | Ellis et al. | | |
| 2019/0145668 A1 | 5/2019 | Takahashi et al. | | |

FOREIGN PATENT DOCUMENTS

| | | |
|---|---|---|
| CN | 110677094 | 1/2020 |
| KR | 10-2012-0008822 | 2/2012 |
| KR | 10-2013-0129361 | 11/2013 |
| KR | 10-2015-0129154 | 11/2015 |
| KR | 10-2017-0023632 | 3/2017 |

OTHER PUBLICATIONS

Chinese Office Action dated Nov. 29, 2024 issued in Application No. 202080100532.6.

\* cited by examiner

PRODUCTION EQUIPMENT FOR PERFORMING CONTROL PARAMETER SETTING AND QUALITY DETERMINATION

CROSS-REFERENCE TO RELATED PATENT APPLICATIONS

This application is a U.S. National Stage Application under 35 U.S.C. § 371 of PCT Application No. PCT/KR2020/016786, filed Nov. 25, 2020, which claims priority to Korean Patent Application Nos. 10-2020-0051282 and 10-2020-0051283, both filed Apr. 28, 2020, whose entire disclosures are hereby incorporated by reference.

TECHNICAL FIELD

The present invention relates to production equipment, and more specifically, to transmit a sine wave of variable frequency, to set a control parameter of the controller using a signal being received from the controller, and to perform quality determination on the controller or the motor, and a production method, a control device for setting a control parameter using a sine wave of variable frequency and performing quality determination, and a control parameter setting method.

BACKGROUND ART

In the production process of producing control boards that control motors, quality determination is performed on control boards or motors, and control boards and motors determined to be good products are shipped. At this time, in order to determine the quality of the control board and the motor, quality determination is performed on each of the control board and the motor, and the control board and the motor are shipped according to the results of each quality determination. At this time, since quality determination is performed respectively, the motor control parameter is fixed to one control parameter when quality determination is performed on the control board, and the control parameter of the control board is fixed to one control parameter when quality determination is performed on the motor. However, since the control parameters are different for each motor or control board, there is a problem in that the actual product is judged as defective even though the actual product is a good product or is judged as good even though the product is not a good product.

In addition, motors have unique characteristics such as resistance, inductance, frictional force, and the like, and the measurement values of these characteristics or design values are used to design position/speed/current control logic. However, there is a deviation between the design values and the manufactured product, and a measurement error may exist even in the measured value.

The characteristic values of the above-mentioned motors vary depending on the sample and may vary depending on the temperature or aging. In order to reflect these characteristics in the control, at present time, since the characteristic values of the motor are measured with a plurality of samples under various conditions during development stage to design the controller value, there is an error between the actual samples, and accordingly, optimal control performance cannot be achieved.

Due to these problems, there is a problem in that the control performance becomes lower than the design value due to the variation between samples, temperature change, and aging.

DETAILED DESCRIPTION OF THE INVENTION

Technical Subject

The technical problem to be solved by the present invention is to transmit a sine wave of variable frequency, set the control parameters of the controller using the signal received from the controller, and provide a production equipment and a production method that perform quality determination on controllers or motors.

Another technical problem to be solved by the present invention is to provide a control device and a control parameter setting method for setting control parameters and performing quality determination using a sine wave of variable frequency.

The subjects of the present invention are not limited to the subjects mentioned above, and other subjects not mentioned will be clearly understood by those skilled in the art from the following description.

Technical Solution

In order to solve the above technical problem, a production equipment according to an embodiment of a first embodiment of the present invention comprises: a frequency response analysis unit that transmits a sine wave of variable frequency to a controller connected to a load, receives a sensing current sensing a current being outputted from the load to which the sine wave is applied from the controller, and analyzes the received sensing current; and a processing unit that receives a result of analyzing the sensing current from the frequency response analysis unit to perform quality determination on the controller or calculates a control parameter of the controller and transmits it to the controller.

In addition, the frequency response analysis unit may analyze the received sensing current by performing a fast Fourier transform.

In addition, the frequency response analysis unit may perform fast Fourier transform using the received sensing current and a sine wave transmitted to the controller.

In addition, the sine wave is a sine wave with a variable frequency, and a signal having one of the variable frequencies may be outputted for one cycle or more, or a signal with a continuously changing frequency may be outputted for one cycle or more.

In addition, the controller may receive a sine wave from the frequency response analysis unit, convert it into a voltage signal, and apply it to the load.

In addition, the processing unit may perform quality determination on the controller or the load using a result of analyzing the sensing current.

In addition, the processing unit may determine the cause of the failure of the load using a result of analyzing the sensing current.

In addition, the processing unit may calculate a PI control parameter, a PID control parameter, or a filter coefficient of the controller using a result of analyzing the sensing current.

In addition, the processing unit may control the frequency response analysis unit by transmitting a mode entry signal to the frequency response analysis unit.

In addition, the frequency response analysis unit may transmit the sine wave to the controller using communication or a digital analog converter (DAC).

In addition, the load may be an actuator.

In order to solve the above technical problem, a production method according to another embodiment of a first embodiment of the present invention comprises the steps of: transmitting a mode entry signal to a frequency response analysis unit; generating a sine wave of variable frequency by the frequency response analysis unit and transmitting it to a controller connected to a load; receiving, from the controller, a sensing current sensing the current being outputted from the load to which the sine wave is applied; analyzing the received sensing current by the frequency response analysis unit; receiving a result of analyzing the sensing current from the frequency response analysis unit; performing quality determination on the controller or the controller and a load using a result of analyzing the sensing current or calculating control parameters of the controller; and transmitting the calculated control parameters to the controller.

In addition, the step of analyzing the received sensing current may be analyzed by performing fast Fourier transform using the received sensing current and a sine wave transmitted to the controller.

In addition, the sine wave is a sine wave with a variable frequency, and a signal having one of the variable frequencies may be outputted for one cycle or more, or a signal with a continuously changing frequency may be outputted for one cycle or more.

In addition, the step of calculating the control parameters of the controller may include calculating a PI control parameter, a PID control parameter, or a filter coefficient of the controller using a result of analyzing the sensing current.

In addition, the step of performing the quality determination on the controller or the load may determine a cause of the failure of the load using a result of analyzing the sensing current.

In order to solve the other technical problems, a control device according to an embodiment of a second embodiment of the present invention comprises: a controller for transmitting a control signal for controlling the load to the load; a sine wave generation unit for generating a sine wave of variable frequency and transmitting it to a load; an analysis unit for analyzing a sensing current sensing the current being outputted from the load; and a processing unit for setting control parameters of the controller using a result of analyzing the sensing current.

In addition, it includes a voltage output unit for converting the control signal of the controller and the sine wave into a voltage signal and transmitting it to the load; and a current measuring unit for sensing the current being outputted from the load.

In addition, the analysis unit may include: a storage unit for storing the sine wave or the sensing current; and an FFT transform unit for performing Fast Fourier Transform using the sine wave and the sensing current.

In addition, the processing unit may perform quality determination on the load or the control device using a result of analyzing the sensing current.

In addition, the sine wave generation unit may generate the sine wave by receiving a mode operation signal from the controller, the production device, or a higher-level controller.

In addition, the sine wave generation unit may periodically generate the sine wave.

In addition, the sine wave is a sine wave with a variable frequency, and a signal having one of the variable frequencies may be outputted for one cycle or more, or a signal with a continuously changing frequency may be outputted for one cycle or more.

In addition, the frequency of the sine wave may be different from the control signal of the controller.

In addition, the processing unit may calculate a PI parameter, a PID parameter, or a filter coefficient of the controller by using a result of analyzing the sensing current.

In addition, the processing unit may set the control parameter of the controller by using an inductance and an impedance of a load derived from a result of analyzing the sensing current.

In addition, the processing unit may determine the cause of the failure of the load using a result of analyzing the sensing current.

In addition, the processing unit may determine whether the load is disconnected, short circuited, increased contact resistance, magnetic demagnetization, or reduced coil insulation.

In addition, the processing unit may estimate the temperatures of the stator and the rotor being included in the load by determining whether the magnetic flux strength, resistance, or inductance of the load changes.

In addition, the load may be an actuator.

In addition, the controller may be a micro controller unit (MCU), and the sine wave generation unit, the analyzer, and the processing unit may be implemented as a processor in the MCU.

In order to solve the other technical problem, a method for setting control parameters according to another embodiment of a second embodiment of the present invention comprises the steps of: generating a sine wave of variable frequency by a sine wave generation unit; transmitting the sine wave to a load together with a control signal generated by a controller; sensing a current being outputted from the load; analyzing the sensed sensing current; and setting control parameters of the controller using a result of analyzing the sensing current.

In addition, the step of analyzing the sensing current may include performing a Fast Fourier Transform using the sine wave and the sensing current.

In addition, it may include a step of performing quality determination on the load or the controller using a result of analyzing the sensing current.

In addition, the step of generating the sine wave may generate the sine wave or periodically generate the sine wave by receiving a mode operation signal from the controller, the production device, or a high-level controller.

In addition, the frequency of the sine wave may be different from the control signal of the controller.

In addition, the step of setting parameters of the controller may set the control parameters of the controller by using an inductance and an impedance of a load derived from a result of analyzing the sensing current.

In addition, the step of analyzing the sensed sensing current may determine whether the load is disconnected, short circuited, increased contact resistance, magnetic demagnetization, or reduced coil insulation.

In addition, the step of analyzing the sensed sensing current may estimate the temperatures of the stator and the rotor being included in the load by determining whether the magnetic flux strength, resistance, or inductance of the load changes by using the result of analyzing the sensing current.

In addition, the control parameter setting method may be performed in a processor of the MCU.

Advantageous Effects

According to the embodiments of a first embodiment of the present invention, quality determination on a motor and a controller is possible in a state in which the controller and the motor are connected. In addition, it is possible to measure the stability of a controller in the frequency domain.

Furthermore, it is possible to design a control parameter for each sample, and it is possible to reduce the deviation between products.

In addition, quality determination on a motor and a controller is possible in a state in which the controller and the motor are connected. In addition, it is also possible to diagnose faults such as magnet demagnetization of the motor, winding insulation reduction, winding disconnection, and winding short circuit. In addition, it is possible to measure the stability of a controller (phase margin, gain margin) in the frequency domain. In addition, it is possible to design the optimal controller values (P, I, D, gain, and filter) by analyzing the characteristics of the desired frequency through the sine wave generation unit inside the controller. In addition, even if the characteristics of the motor change as the operating environment (temperature, aging, and the like) of the motor changes, control performance (ripple in steady state, responsiveness in transient, and the like) can always be maintained optimal by measuring the motor characteristics online to find the optimal control value. Furthermore, since it is possible to measure the mutual interference component that used to be compensated based on equation, the mutual interference component can be accurately compensated.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1A:
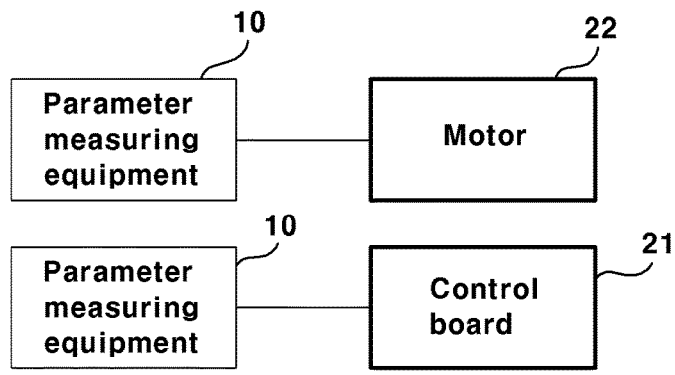
FIGS. 1A and 1B illustrate a production process of a control parameter measuring device according to a comparative example with a first embodiment of the present invention.
Figure 1B:
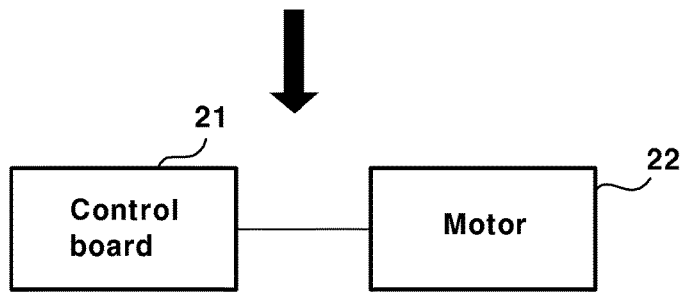

FIG. 1 illustrates a production process of a control parameter measuring device according to a comparative example with a first embodiment of the present invention.

For the control board that forms the controller and the motor that is the load controlled by the control board, quality determination is performed whether the control board and the motor satisfy the design specifications before shipment. In order to determine whether the control board 21 or the motor 22 is a good product, the control parameters of the control board 21 and the motor 22 are measured using the control parameter measuring equipment 10, and the quality determination on the control board 21 and the motor 22 is performed using the measured control parameters. As for the motor, as shown in FIG. 1 (A), control parameters such as resistance and inductance in a single unit state of the motor 22 are measured, it is judged whether the measured control parameters satisfy the good product criterion, and the good products are shipped. The control board 21 is shipped after calibration and quality determination for each sample in a single product state, in setting the control parameters of the control board 21 before shipment, it is assumed that the control parameters of the motor are the same as those of the development sample, and the controller values (P, I, D, gain, and filter) are applied as one and the same value before shipment.

After quality determination on the motor 22 and the control board 21, as shown in FIG. 1 (B), it may be determined as defective when the connection state between the control board 21 and the motor 22 is poor. In the case of good products that have passed the response test, since all the same controller values are applied as described above, there may be a difference in performance between products that have been determined as good products.

In this way, when performing quality determination by measuring control parameters for each of the control board 21 and the motor 22 separately, when an actual control board 21 is applied to the motor 22, it may not be suitable for the operation of the motor 220 to which the control parameter of the control board 21 is connected. For more accurate quality determination and control parameter setting in the production process, the production equipment according to an embodiment of a first embodiment of the present invention uses frequency response analysis. Hereinafter, production equipment according to an embodiment of a first embodiment of the present invention will be described in detail.

Figure 2:
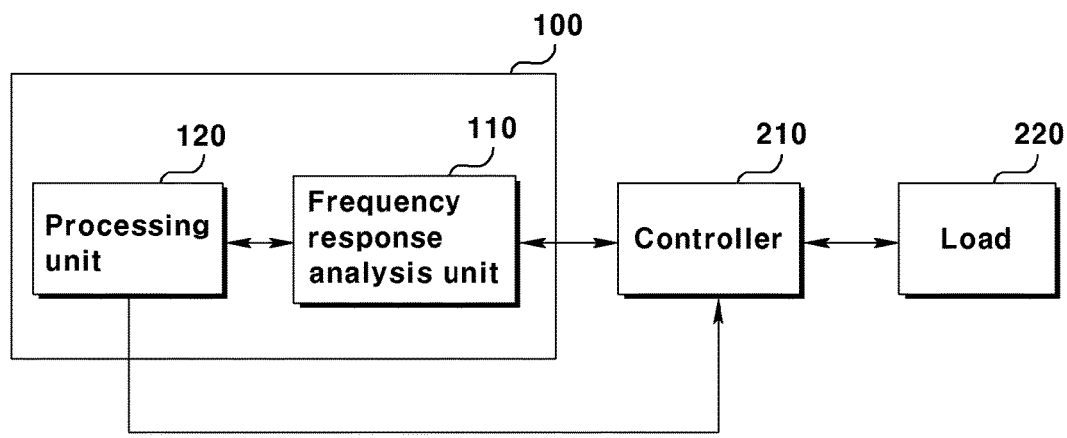
FIG. 2 is a block diagram of a production equipment according to an embodiment of a first embodiment of the present invention.

FIG. 2 is a block diagram of a production equipment according to an embodiment of a first embodiment of the present invention.

The production equipment 100 according to an embodiment of a first embodiment of the present invention comprises a frequency response analysis unit 110 and a processing unit 120. A communication unit for transmitting and receiving signals or a memory for storing control parameters may be included.

The frequency response analysis unit 110 transmits a sine wave of variable frequency to the controller 210 connected to the load 220, receives a sensing current sensing a current being outputted from the load 220 to which the sine wave is applied from the controller 210, and the applied sine wave and the received sensing current are analyzed.

More specifically, in order to measure the control parameters for the controller 210 and the load 220, the frequency response analysis unit 110 transmits a sine wave of variable frequency to the controller 210 connected to the load 220. That is, the controller 210 and the load 220 are connected, and a sine wave of a variable frequency is transmitted to the controller 210 while the controller 210 and the load 220 are connected.

Figure 3A:
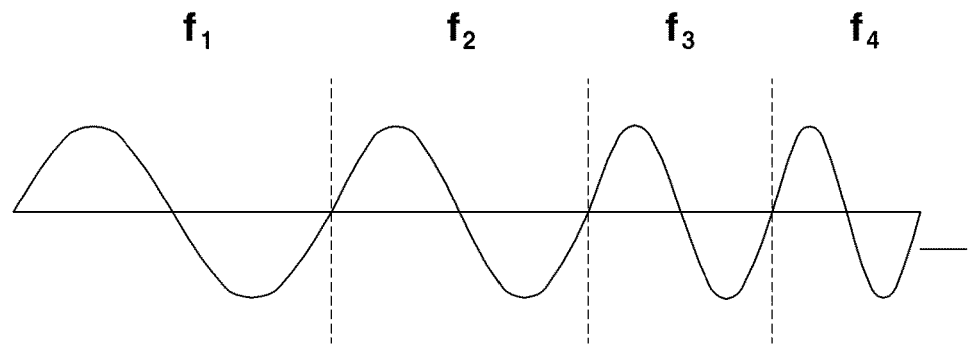
FIGS. 3A and 3B illustrate a sine wave being used in a production equipment according to an embodiment of a first embodiment of the present invention.
Figure 3B:
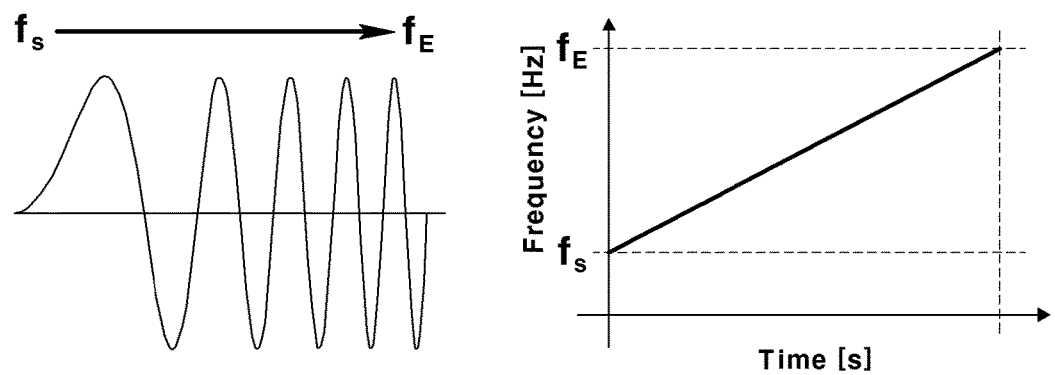

Here, the sine wave means a signal whose waveform is a sine curve, also referred to as a sine wave. The frequency response analysis unit 110 transmits a sine wave having a variable frequency, but one frequency may be outputted in one cycle or more. As shown in FIG. 3, a sine wave having a variable frequency may be transmitted. At this time, as shown in FIG. 3 (A). A sine wave can be outputted so that the frequency gradually increases or the frequency gradually decreases. Or, it may gradually increase and decrease, or decrease and increase, or may vary randomly. The varying frequencies may vary linearly or exponentially. In addition, the frequency may be varied in various ways. At this time, a signal having one of the variable frequencies can be outputted for more than one cycle. Since the control parameter is measured using the response in one cycle, the frequency response analysis unit 110 may output a waveform being formed of one frequency in one cycle or more.

Or, as shown in FIG. 3 (B), a signal whose frequency is continuously changed may be outputted in one cycle or more. As shown in FIG. 3 (B), the frequency may be varied so that the frequency gradually increases from the start time fS(Start) to the end time fE(End) as time elapses. For example, it may be in the form of a chirp signal. The frequency may gradually increase or decrease gradually, and may change linearly or exponentially as shown in FIG. 3 (B). Or, it may increase and then decrease, or may vary randomly. In addition, the frequency may be varied in various ways.

The frequency response analysis unit 110 may transmit the sine wave to the controller 210 using communication or a digital analog converter (DAC). The frequency response analysis unit 110 may use communication or a digital analog converter (DAC) in transmitting a sine wave of variable frequency to the controller 210. The frequency response analysis unit 110 may convert a sine wave signal into a communication signal in accordance with the communication to which the sine wave is to be transmitted and transmit it to the controller 210. At this time, the frequency response analysis unit 110 transmits a communication signal corresponding to a sine wave of variable frequency using a variety of wired and wireless communication, and the controller 210 may receive it, convert it back into a sine wave, or convert it into another form and apply it to the load 220.

Or, the frequency response analysis unit 110 may transmit a sine wave through a DAC. The DAC is a device that converts digital signals to analog signals. The frequency response analysis unit 110 may apply a sine wave of variable frequency through the DAC, and transmit the sine wave to the controller 210 through the conversion in the DAC. The controller 210 senses the current being outputted from the load 220 according to the sine wave of variable frequency transmitted from the frequency response analysis unit 110 to the controller 210, and the frequency response analysis unit 110 receives the sensed sensing current from the controller 210. The controller 210 may receive a sine wave from the frequency response analysis unit 110, convert it into a voltage signal, and apply it to the load 220. The load 220 being connected to the controller 210 may be an actuator. Here, the actuator is a driving device that operates the device using power, and refers to a motor that forms a predetermined controller, or a piston or cylinder mechanism operated by hydraulic or pneumatic pressure. That is, the load 220 may be a motor, and the controller 210 may be a motor driving controller that drives the motor.

The controller 210 converts a sine wave of variable frequency into a voltage signal and applies it to the load 220, and the load 220 operates according to the applied voltage signal and outputs a current. The controller 210 measures the current being outputted from the load 220, and the controller 210 transmits the measured current to the frequency response analysis unit 110. The controller 210 may measure the current being outputted from the load 220 using a current measuring device such as a shunt resistor. Or, the current being outputted from the load 220 may be measured using various devices such as a current mirror circuit and a voltage measuring device.

The frequency response analysis unit 110 analyzes the sensed sensing current. In order to derive control parameters for the controller 210 and the load 220 from the sensed sensing current, the frequency response analysis unit 110 analyzes the sensing current sensed by the controller 210 and received by the frequency response analysis unit 110 from the controller 210.

In analyzing the sensing current, the frequency response analysis unit 110 may analyze the received sensing current by performing a fast Fourier transform. Fast Fourier transform (FFT) is a method of processing the Fourier transform of discrete data at high speed and is used to analyze a signal. When using the fast Fourier transform, fast processing is possible by reducing the number of times of multiplication that takes time through changing the order of the data by using sequential decomposition of the discrete Fourier transform of a long signal sequence into a discrete Fourier transform of a shorter signal sequence, and by using symmetry and periodicity of rotation factors.

The frequency response analysis unit 110 may perform fast Fourier transform using the received sensing current and the sine wave transmitted to the controller 210. The sine wave transmitted from the frequency response analysis unit 110 to the controller 210 is stored in the memory, and when a sensing current corresponding to the stored sine wave is received, fast Fourier transform can be performed using the received sensing current and the stored sine wave. The frequency response analysis unit 110 may know the frequency response characteristic of the controller 210 to which the load 220 is connected through a fast Fourier transform. Frequency response means measuring what kind of response is outputted when an input signal of various frequencies are applied to a certain system, and is used to analyze a corresponding system. The amplitude of the signal may be constant or may vary. The frequency response may represent amplitude and phase of a signal being outputted from a system as a curve with respect to frequency.

The frequency response analysis unit 110 may be implemented as a frequency response analyzer. Frequency response analyzer (FRA) is a high-precision measuring device used to analyze components, circuits, or systems in the frequency domain, and generates a sine wave signal and applies it to the test object. The sine wave signal is measured at the injection point using one of the input channels of the frequency response analyzer, the injected signal passes through the object under test and the output signal is measured in another channel to analyze the frequency response. At this time, the frequency response analyzer can perform a fast Fourier transform. The frequency response of the test object can be analyzed using sine wave.

The processing unit 120 receives the result of analyzing the sensing current from the frequency response analysis unit 110 and performs quality determination on the controller 210 or the control parameters of the controller 210 are calculated and transmitted to the controller 210.

More specifically, the processing unit 120 receives a result of analyzing the sensing current from the frequency response analysis unit 110. As described above, the frequency response analysis unit 110 analyzes the sensing current through the fast Fourier transform, and transmits the analyzed result to the processing unit 120. The processing unit 120 may perform quality determination on the controller 210 using the result received from the frequency response analysis unit 110. By performing quality determination on the controller 210 in the state in which the load 220 is connected, accurate quality determination on the controller 210 and the load 220 that are actually connected together and being installed and driven in the system can be performed. The problem that may occur in practical application, in the case when performing quality determination without connecting the controller 210 and the load 220, in which quality determination is performed by assuming control parameters for the other part, does not occur in the production equipment according to an embodiment of a first embodiment of the present invention in which the load 220 is connected to the controller 210, and the control parameters are measured for the controller 210 to which the load 220 is connected. The processing unit 120 may perform quality determination on the load 220 as well as the controller 210. Since the load 220 is connected to the controller 210, the processing unit 120 may perform quality determination on the load 220 as well as the controller 210. That is, it may perform quality determination on each of the controller 210 and the load 220, or perform quality determination on the controller 210 and the load 220 as one set.

The processing unit 120 may perform quality determination on the controller 210 or the load 220 using a result of analyzing the sensing current. Quality determination on the controller 210 or the load 220 may be performed on the basis of whether the control parameter according to the result of analyzing the sensing current satisfies the quality determination criterion. The quality determination criterion may have a lower limit and an upper limit, or may be set in a predetermined range having a lower limit or an upper limit. The quality determination criterion is set according to the design specifications of the controller 210 and the load 220, or may be set according to safety or safety level, or may be set by a user. The quality determination criterion may be stored in a memory. It may be stored as a lookup table (LUT).

The processing unit 120 may derive an inductance value L and a resistance value R or an impedance value Z from the result of analyzing the sensing current. Quality determination on the controller 210 or the load 220 may be performed using the derived inductance value, resistance value, or impedance value. That is, quality determination on the controller 210 and the load 220 may be performed by determining whether it is within the reference range of the inductance value and the resistance value or the impedance value is within the inductance reference range.

The processing unit 120 may determine the cause of the failure of the load 220 using a result of analyzing the sensing current. The processing unit 120 not only performs quality determination on the load 220 using the result of analyzing the sensing current, but also may determine the cause of the failure of the load 220 when determining that the load 220 is defective. By determining which failure cause the load 220 is defective, and storing and accumulating the failure cause information, it is possible to know the cause of the defect that frequently occurs during production for the load 220 at present time, and it is possible to know which defects are occurring at which rate in which production line. That is, the management of the production line or the production system can be performed using the defect cause information.

The processing unit 120 may derive an inductance value and an impedance value through analysis of the sensing current, and may determine a cause of a failure using the inductance value and the impedance value. At this time, the criteria for determining the cause of failure and classification may vary depending on the type of the load 220. For example, when the load 220 is a three-phase motor and the controller 210 drives the motor using a three-phase power source, the processing unit 120 may determine disconnection, short circuit, contact resistance increase, magnet demagnetization, coil insulation reduction, and the like as cause of defects.

If the impedance of the phase where the disconnection occurred suddenly decreases to zero, it can be determined that a winding disconnection has occurred. Conversely, if the impedance of the phase in which the short circuit occurs suddenly increases compared to the existing value, it may be determined that a winding short circuit has occurred. In addition, if the resistance of a specific phase among the measured impedances increases, it can be determined as an increase in the contact resistance due to the increased contact resistance for that phase.

When the magnitude of a measured current becomes larger than before at a frequency, a predetermined frequency, for example in a region less than 100 Hz, of the voltage being applied at the same temperature and rotational speed, it can be determined that the magnet is demagnetized. In addition, when the current is large, while the winding temperature increases, and if the inductance measured in a region where the frequency of the applied voltage is 100 Hz or more becomes smaller than the existing value, it can be determined that the magnet is demagnetized. When the resistance and inductance of the coil whose insulation is being reduced progress in a direction in which the insulation is reduced slightly, it can be determined that the insulation reduction of the coil has occurred. In addition, various causes of failure may be determined.

In addition, the processing unit 120 may estimate the temperatures of the stator and the rotor being included in the load by determining whether the magnetic flux strength, resistance, or inductance of the load changes by using the result of analyzing the sensing current. The load, like a motor, may include a stator and a rotor, and the load including the stator and rotor is greatly affected by temperature. Therefore, in measuring the temperature of the stator and rotor, the result of analyzing the sensing current can be used. The temperature of the stator and rotor can be estimated by determining at least one of a change in the magnetic flux strength of the load, a change in resistance, or a change in inductance by using the result of analyzing the sensing current. In this way, it is possible to determine whether or not a failure occurs or the probability of occurrence of a failure according to the estimated temperature.

The processing unit 120 may not only perform the quality determination on the controller 210 or the load 220, but also calculate a control parameter of the controller 210 using the result of analyzing the sensing current. The calculated control parameter may be transmitted to the controller 210 to change or set the control parameter of the controller 210. The controller 210 sets a control parameter to control the load 220. The control parameters of the controller 210 that are to be set according to the type and characteristics of the controller 210 may vary.

The processing unit 120 may calculate a PI control parameter, a PID control parameter, or a filter coefficient of the controller 210 using a result of analyzing the sensing current.

The processing unit 120 calculates a PI control parameter when the controller 210 is a PI controller, calculates the PID control parameters when the controller 210 is a PID controller, and may calculate a filter coefficient when a filter is included. The controller 210 may be an automatic controller, and may be controlled using a combination of P, I, and D.

Here, P means proportional, I means integral, and D means differential. Proportional (P) control is a control that makes the control amount proportional to the difference between the target value and the current position, and as it approaches the target value, the difference of the control values decreases and thus fine control becomes possible. When performing proportional control, when the control amount approaches the target value, the control amount becomes too small and it becomes impossible to finely control it, so that there are residual deviations that remain uncontrollable anymore. PI control is a control using proportional and integral, and a residual deviation can be removed by using PI control. Minute residual deviation is accumulated over time to increase the control amount according to the accumulated residual deviation, thereby eliminating the deviation, and since it is a control in which an integral operation is added to a proportional operation, it is called a PI control. In case of PI control, it is possible to control close to the actual target value, but as it approaches the target value, the control amount decreases, and an operation for a certain period of time or longer is required. At this time, if the integer is large, the response performance may deteriorate when there is an external disturbance. That is, it may be difficult to quickly respond to the external disturbance and it may be difficult to return to the target value. To solve this, a differentiation operation may be performed. By observing the deviation for a sudden disturbance, and if the difference from the previous deviation is large, the manipulated value is increased to respond. Observing the deviation difference from the previous time corresponds to differentiation, and PID control is performed by applying differential to proportional and integral. Even if the control amount deviates from the target value, it is determined as a deviation from the previous time and the target value can be quickly reached by applying the control amount.

The PID control may be expressed as a PID control equation, and the PID control parameters may be expressed as Kp, Ki, and Kd. The PID parameter may be calculated through optimization by using a step response method or a limit reduction method. The PI control may correspond to this, and calculate the PI control parameters Kp and Ki.

The processing unit 120 may transmit the calculated control parameters to the controller 210 so that the controller 210 sets or changes the control parameters with the calculated control parameter. Since the control parameters calculated by the processing unit 120 are control parameters calculated in a state in which the load 220 is connected, they are the control parameters adaptively calculated in a state in which the load 220 and the controller 210 are connected, and correspond to the optimal control parameters of the controller 210.

The processing unit 120 may calculate the control parameters of the controller 210 at the same time as the quality determination or after the quality determination. When the controller 210 and the load 220 are good products, the control parameters may be calculated in order to set optimal parameters for the controller 210 in a state in which the load 220 is connected. When the controller 210 or the load 220 is defective, the control parameter calculation may not be performed. Or, the result according to the control parameters set in the current controller 210 is bad, but when it is determined to be bad within the range that may be determined to be good when the control parameters are changed, the quality determination result for the controller 210 or the load 220 may be changed by changing the control parameters thereof. Or, quality determination may be performed again after changing the control parameters. Through this, it may prevent the cases that may be determined to be defective even when they may be determined to be good when the control parameters are changed. When performing individual quality determination on the load 220 using a fixed control parameter, a case may occur in which a defective determination is made on a load 220 even though the load 220 can be used as a good product when the control parameters are changed. However, in the production equipment according to an embodiment of a first embodiment of the present invention, not only performs the quality determination on a controller 210 to which the load 220 is connected, but also increases the possibility and accuracy of quality determination on the load 220 by changing the result for the load 220 using the change of the control parameters.

The processing unit 120 may control the frequency response analysis unit 110 by transmitting a mode entry signal to the frequency response analysis unit 110. The processing unit 120 transmits a mode entry signal to the frequency response analysis unit 110 for quality determination or control parameter calculation for the controller 210 to which the load 220 is connected, so that the frequency response analysis unit 110 may transmit a sine wave of variable frequency to the controller 210. That is, the processing unit 120 may transmit a mode entry signal to the frequency response analysis unit 110 in order to start a series of processes of quality determination or control parameter calculation. The frequency response analysis unit 110 may receive a mode entry signal from the processing unit 120 and transmit a sine wave of a variable frequency to the controller 210. Or, the frequency response analysis unit 110 may transmit a sine wave of a variable frequency to the controller 210 when the controller 210 is positioned at a predetermined position without receiving a mode entry signal. Or, a sine wave of variable frequency may be periodically transmitted to the controller 210.

Figure 4:
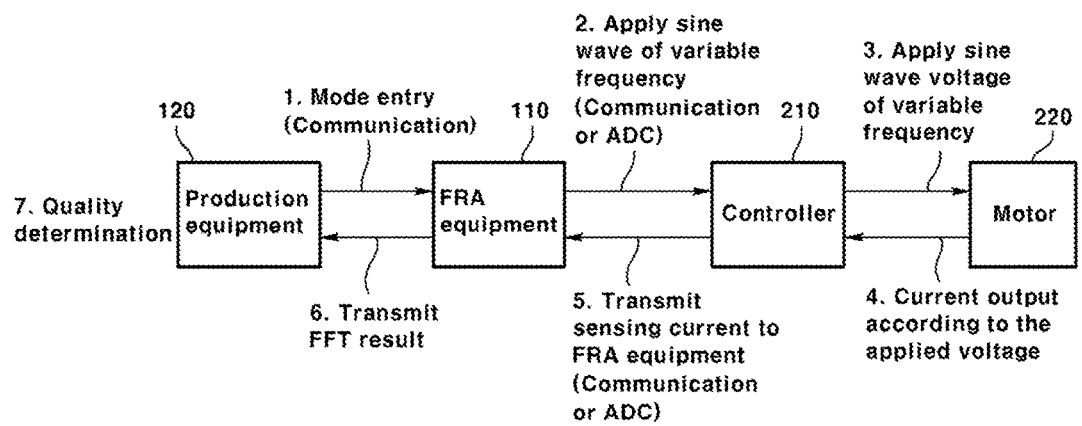
FIGS. 4 and 5 are diagrams for explaining the operation of a production equipment according to a first embodiment of the present invention.
Figure 5:
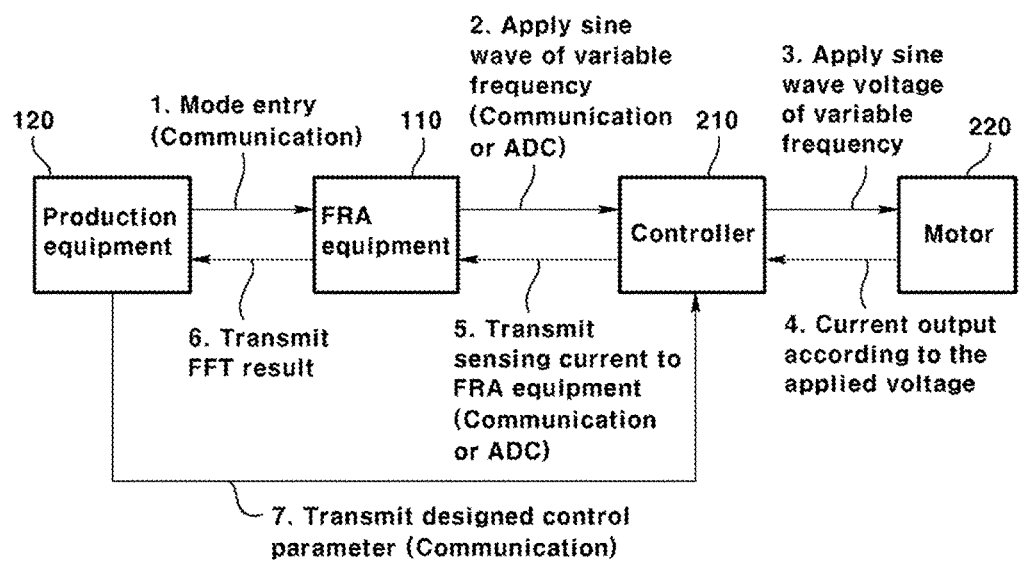

FIGS. 4 and 5 are diagrams for explaining the operation of a production equipment according to a first embodiment of the present invention. The frequency response analysis unit may be implemented using a frequency response analyzer (FRA) 110, and the processing unit may be production equipment 120. A load being connected to the controller 210 may be a motor 220. In the process of setting the control parameters by analyzing the frequency response for the controller 210 to which the motor 220 is connected, as shown in FIG. 4, first, the production equipment 120 transmits a mode entry signal to the FRA equipment 110 using communication or the like. When it is entered in a mode, a sine wave of variable frequency is generated in the FRA device 110, and this signal is transmitted to the controller through communication or DAC. Here, the signal of variable frequency must be outputted one cycle or more. For example, if 1 Hz and 10 Hz signals are being outputted, after 1 Hz signal is outputted for 1 cycle or more, 10 Hz signal should be outputted for 1 cycle or more. The controller 210 may receive a sine wave of a variable frequency through communication or ADC. A sine wave of variable frequency received from the controller 210 is converted into a voltage signal to be applied to the motor 220 to apply a voltage to the motor 220. At this time, variable frequency may change, but the frequency does not change. A current according to the input voltage flows, and the current value is measured by the controller 210. The controller 210 transmits the signal of the measured current to the FRA equipment through communication or DAC. The FRA equipment 110 may receive the signal of the measured current through communication or ADC. The FRA equipment 110 performs fast Fourier transform (FFT) using the variable frequency sine wave signal outputted by the controller 210 and the current signal received from the controller, and delivers the result to the production equipment 120. The production equipment 120 receiving the FFT signal may design an optimal control value (P, I, D, gain or filter coefficient) and transmit it to the controller 210 to set the control parameters of the controller 210. Through this, it is possible to set the control parameters for each sample and to reduce the deviation between products by compensating for the deviation between products using P, I, D, gain or filter.

In addition, the production equipment 120 may make quality determination based on the FFT signal, as shown in FIG. 5. Through this, quality determination on a motor 220 and a controller 210 is possible in a state in which the controller 210 and the motor 220 are connected. In addition, it is possible to measure controller stability (phase margin and gain margin) in the frequency domain without repeated testing according to the step response in the time domain.

Figure 6:
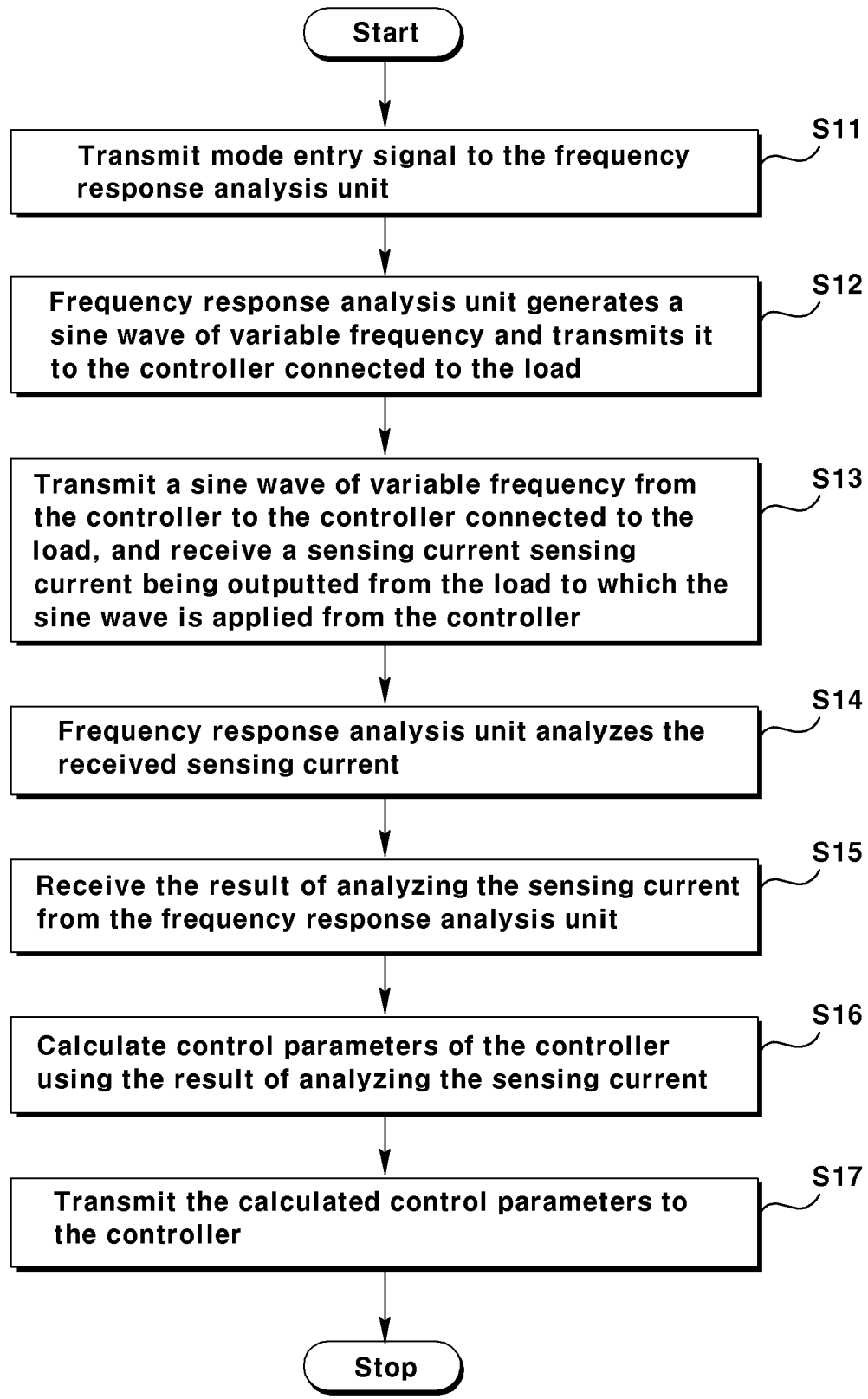
FIG. 6 is a flowchart of a production method according to an embodiment of a first embodiment of the present invention.
Figure 7:
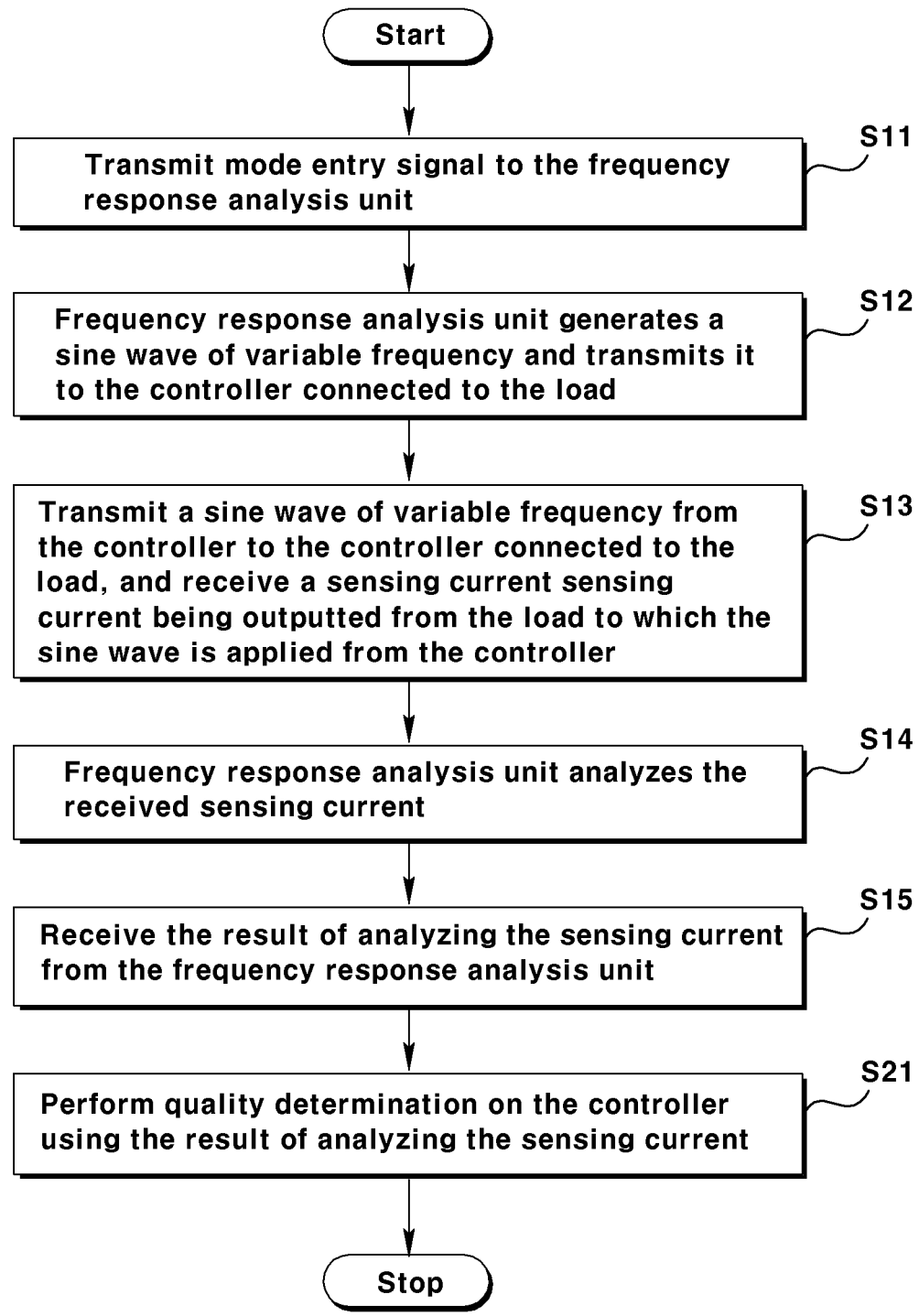
FIG. 7 is a flowchart of a production method according to another embodiment of a first embodiment of the present invention.

FIG. 6 is a flowchart of a production method according to an embodiment of a first embodiment of the present invention; and FIG. 7 is a flowchart of a production method according to another embodiment of a first embodiment of the present invention. A detailed description of each step of FIGS. 6 and 7 corresponds to the detailed description of the production equipment of FIGS. 1 to 5, and thus overlapping descriptions will be omitted. Each step of FIGS. 6 and 7 may be configured in one processor included in the production equipment.

In step S11, a mode entry signal is transmitted to the frequency response analysis unit, and in step S12, the frequency response analysis unit generates a sine wave of variable frequency and transmits it to the controller connected to the load. The sine wave is a sine wave with a variable frequency, and a signal having one of the variable frequencies may be outputted in one cycle or more, or a signal having a continuously changing frequency may be outputted in one cycle or more. Thereafter, in step S13, a sensing current sensing the current being outputted from the load to which the sine wave is applied from the controller is received, and in step S14, the frequency response analysis unit analyzes the received sensing current. In analyzing the received sensing current, fast Fourier transform may be performed for analysis using the received sensing current and a sine wave transmitted to the controller.

After that, in step S15, a result of analyzing the sensing current from the frequency response analysis unit is received, and in step S16, a control parameter of the controller is calculated using a result of analyzing the sensing current. In calculating the control parameters of the controller, PI control parameter, PID control parameter, or filter coefficient of the controller can be calculated using the result of analyzing the sensing current. When the control parameters are calculated, in step S17, the calculated control parameter is transmitted to the controller.

In addition, after step S15, quality determination on the controller or the load may be performed in step S21. In performing the quality determination on the controller or the load, a cause of the failure of the load may be determined using a result of analyzing the sensing current.

As described above, the production equipment and production method according to a first embodiment of the present invention have been described with reference to FIGS. 1 to 7. Hereinafter, a control device and a control parameter setting method according to a second embodiment of the present invention will be described with reference to FIGS. 8 to 19. Detailed description of the control device and control parameter setting method according to the second embodiment of the present invention, and production equipment and production methods, names, terms, or functions according to the first embodiment of the present invention are based on the detailed description of each embodiment, and may be the same as or different from each other.

Hereinafter, a configuration of a control device and a control parameter setting method according to a second embodiment of the present invention will be described with reference to the drawings.

Figure 8:
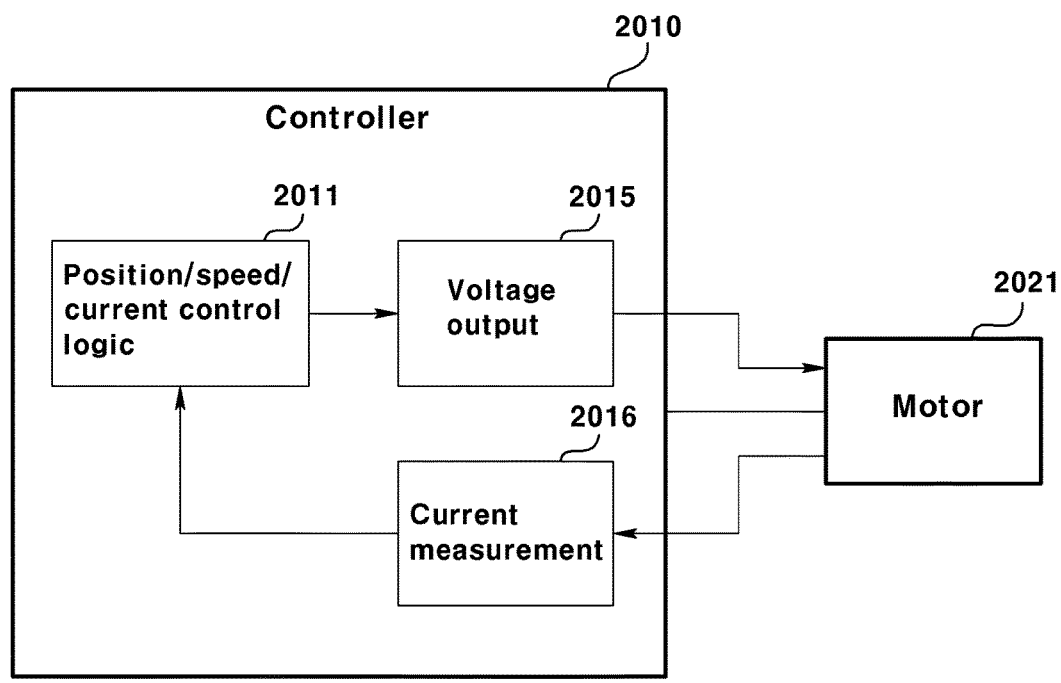
FIG. 8 illustrates an operation of a controller according to a comparative example with a second embodiment of the present invention.

FIG. 8 illustrates an operation of a controller according to a comparative example with a second embodiment of the present invention. In a controller that drives a load such as a motor, the controller 2010 applies a voltage for driving the motor to the motor 2021 through the voltage output 2015 in the position/speed/current control logic 2011, senses the current flowing according to the applied voltage in the current measurement 2015, and uses to drive the motor 2021 in the position/speed/current control logic 2011 using the sensed sensing current. In the position/speed/current control logic 2011, control parameters for driving the motor 2021 are set, and the control parameters are set using characteristic values or design values of the motor.

At this time, when using design values, since deviations between design values and manufactured products may occur and the characteristic values of the motor may change with temperature change or aging, it may be difficult to achieve optimal control performance with the previously set control parameters of the position/speed/current control logic 2011.

In order to achieve optimal control performance even when errors or changes in load characteristics occur according to the characteristics of the load, a control device according to an embodiment of a second embodiment of the present invention may use frequency response analysis to set or change control parameters. Hereinafter, a production equipment according to an embodiment of a second embodiment of the present invention will be described in detail.

Figure 9:
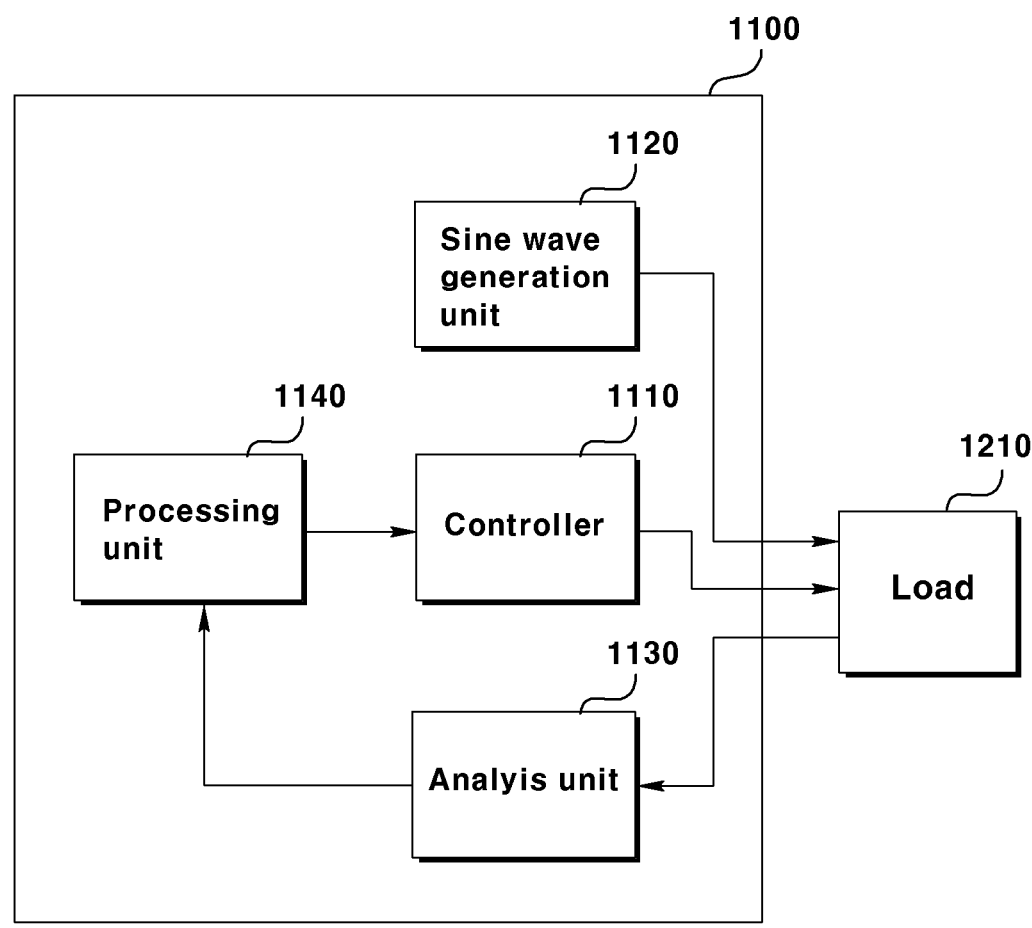
FIG. 9 is a block diagram of a control device according to an embodiment of a second embodiment of the present invention.
Figure 10:
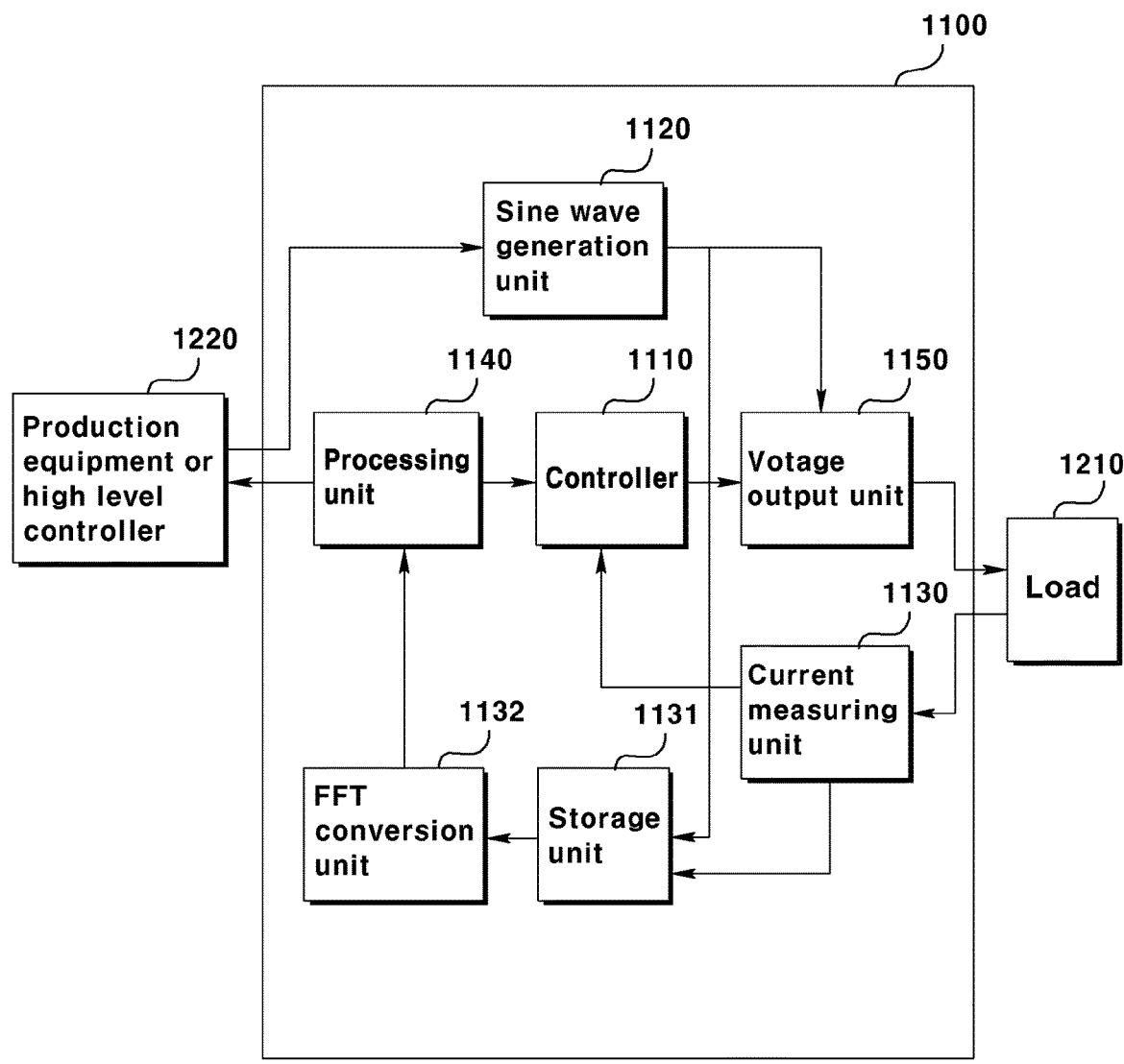
FIG. 10 is a block diagram of a control device according to another embodiment of a second embodiment of the present invention.

FIG. 9 is a block diagram of a control device according to an embodiment of a second embodiment of the present invention.

The control device 1100 according to an embodiment of the second embodiment of the present invention comprises: a controller 1110, a sine wave generation unit 1120, an analysis unit 1130, and a processing unit 1140, and may include a voltage output unit 1150, a current measurement unit 1160, a storage unit 1131, and an FFT conversion unit 1132.

The controller 1110 transmits a control signal for controlling the load 1210 to the load 1210.

More specifically, the controller 1110 controls the load 1210 according to the set control parameter, and transmits a control signal to the load 1210 to control the load 1210. The load 1210 being connected to the control device 1100 may be an actuator. Here, the actuator is a driving device that operates the device using power, and refers to a motor operated by a predetermined controller, or a piston or cylinder mechanism operated by hydraulic or pneumatic pressure. The load 1210 may be a motor, and the control device 1100 may be a motor driving device for driving the motor.

The sine wave generation unit 1120 generates a sine wave of variable frequency and transmits it to the load 1210.

More specifically, the sine wave generation unit 1120 generates a sine wave of variable frequency and transmits it to the load 1210 in order to determine the characteristics of the load 1210.

Here, the sine wave means a signal whose waveform is a sine curve, also referred to as a sine wave. The sine wave generation unit 1120 transmits a sine wave having a variable frequency, but one frequency may be outputted in one cycle or more. As shown in FIG. 3, the sine wave generation unit 1120 may transmit a sine wave having a variable frequency, which is formed of a sinusoidal curve. At this time, as shown in FIG. 3 (A). A sine wave can be outputted so that the frequency gradually increases or the frequency gradually decreases. Or, it may gradually increase and then decrease, or decrease and increase, or may vary randomly. The varying frequencies may vary linearly or exponentially. In addition, the frequency may be varied in various ways. At this time, a signal having one of the variable frequencies can be outputted for one cycle or more. Since the control parameter is measured using the response in one cycle, the sine wave generation unit 1120 may output a waveform formed with one frequency for one cycle or more.

Or, as shown in FIG. 3 (B), a signal whose frequency is continuously changed may be outputted in one cycle or more. As shown in FIG. 3 (B), the frequency may be varied so that the frequency gradually increases from the start time fS(Start) to the end time fE(End) as time elapses. For example, it may be in the form of a chirp signal. The frequency may gradually increase or decrease gradually, and may change linearly or exponentially as shown in FIG. 3 (B). Or, it may increase and then decrease, or may vary randomly. In addition, the frequency may be varied in various ways.

The sine wave generation unit 1120 may receive a mode operation signal from the controller 1110 to generate a sine wave of variable frequency. When it is necessary to reset or change the control parameter, the controller 1110 may control the sine wave generation unit 1120 to generate a sine wave of variable frequency. Or, the high level controller 1220 may enable the sine wave generation unit 1120 to generate a sine wave of variable frequency through a mode operation signal. When a control parameter is set in the production process, the production device 1220 may control the sine wave generation unit 1120 to generate a sine wave of variable frequency. Upon receiving the mode operation signal, the sine wave generation unit 1120 generates a sine wave of variable frequency and transmits it to the load 1210.

Or, the sine wave generation unit 1120 may periodically generate the sine wave. Even if the mode operation signal is not received from the controller 1110, the high level controller 1220, or the production equipment 1220, a sine wave of a variable frequency may be periodically generated for periodic control parameter update. The period for generating a sine wave of variable frequency may be set in units of months or years for updating control parameters, and may be set in units of seconds, minutes, hours, and days for failure determination of the load 1210. In addition, it is natural that various periods may be set. The variable frequency sine wave generation period may vary according to the characteristics of the load 1210 being connected to the control device 1100 or the characteristics of the control device 1100, and may be set by a user. Or, the sine wave generation unit 1120 may continuously change the frequency to generate a sine wave.

The load 1210 receives a control signal from the controller 1110 and receives a sine wave of variable frequency from the sine wave generation unit 1120. The load 1210 may receive a control signal and a sine wave of variable frequency together. At this time, the frequency of the sine wave may be different from that of the control signal of the controller. Since the frequency of the control signal for driving the load 1210 and the frequency of the sine wave for setting the control parameter should be distinguished, the sine wave generation unit 1120 may generate a sine wave having a frequency different from that of the control signal. The sine wave generation unit 1120 may generate a sine wave by varying the frequency to include at least one frequency different from the control signal. In generating the variable frequency, the sine wave generation unit 1120 may vary the frequency except for a sine wave having the same frequency as the frequency of the control signal. A response to an already corresponding frequency may be received from the control signal and analyzed. Or, the frequency may be varied by including the same frequency as the frequency of the control signal. Or, the load 1210 may receive the control signal and the sine wave of variable frequency independently through a separate input line, or may be applied with different input periods.

The control signal of the controller and the sine wave of variable frequency may be transmitted to the load 1210 through the voltage output unit 1150. The voltage output unit 1150 may convert a control signal of the controller 1110 and a sine wave of the sine wave generation unit 1120 into a voltage signal and transmit it to the load 1210. The load 1210 may be a device that receives a voltage and operates, for example, a motor, and the voltage output unit 1150 receives a control signal and a sine wave in order to apply a voltage to the load 1210, and the voltage output unit 1150 may transmit voltage corresponding to the frequency to the load 1210 according to the frequency of the control signal and sine wave. The voltage output unit 1150 may be a bridge circuit formed of a plurality of switches. The upper switch and the lower switch forming the bridge are conducted complementarily to each other and may transmit a three-phase voltage to the load 1210 with a phase difference in each bridge circuit.

The analysis unit 1130 analyzes the sensing current sensed by the current being outputted from the load 1210.

More specifically, in order to set the control parameters, a sine wave is generated by the sine wave generation unit 1120 and applied to the load 1210, and the analysis unit 1130 analyzes the sensing current sensing the current being outputted from the load 1210 according to the applied sine wave.

The current measuring unit 1160 senses the current being outputted from the load. The current measuring unit 1160 is connected to the output line of the load 1210 to sense the current. The current may be formed by a current measuring element such as a shunt resistor. Or, the current being outputted from the load 1210 may be sensed using various devices such as a current mirror circuit and a voltage measuring device.

The sensing current sensed by the current measuring unit 1160 may be used by the controller 1110 to generate a control signal, and the analysis unit 1130 may be used to analyze a frequency response to a control parameter.

In analyzing the sensing current, the analysis unit 1130 may analyze the received sensing current by performing a fast Fourier transform. Fast Fourier transform (FFT) is a method of processing the Fourier transform of discrete data at high speed and is used to analyze a signal. When using the fast Fourier transform, fast processing is possible by reducing the number of times of multiplication that takes time through changing the order of the data by using sequential decomposition of the discrete Fourier transform of a long signal sequence into a discrete Fourier transform of a shorter signal sequence, and by using symmetry and periodicity of rotation factors.

The analysis unit 1130 may perform fast Fourier transform using the received sensing current and the sine wave transmitted from the sine wave generation unit 1120 to the load 1210. In performing fast Fourier transform, the analysis unit 1130 may comprise a storage unit 1131 for storing the sine wave or the sensing current, and an FFT transform unit 1132 for performing fast Fourier transform using the sine wave and the sensing current.

The sine wave generated by the sine wave generation unit 1120 and transmitted to the load 1210 is branched and stored in the storage unit 1131, and when the sensing current corresponding to the stored sine wave is received, the FFT transform unit 1132 may perform fast Fourier transform using the received sensing current and the stored sine wave. The FFT transform unit 1132 may know the frequency response characteristic of the load 1210 through the fast Fourier transform. Frequency response means measuring what kind of response is outputted when an input signal of various frequencies are applied to a certain system, and is used to analyze a corresponding system. The amplitude of the signal may be constant or may vary. The frequency response may represent amplitude and phase of a signal being outputted from a system as a curve with respect to frequency.

The processing unit 1140 sets the control parameters of the controller 1110 by using the result of analyzing the sensing current.

More specifically, the processing unit 1140 receives a result of analyzing the sensing current from the frequency response analysis unit 1130. As described above, the analysis unit 1130 analyzes the sensing current through the fast Fourier transform, and transmits the analyzed result to the processing unit 1140. The processing unit 1140 may calculate control parameters of the controller 1110 using a result of analyzing the sensing current. The calculated control parameters may be transmitted to the controller 1110 to change or set the control parameters of the controller 1110. The controller 1110 sets control parameters to control the load 1210. The control parameters of the controller 1110 may be different parameters to be set according to the characteristics of the type of the controller 1110.

The processing unit 1140 may calculate a PI control parameter, a PID control parameter, or a filter coefficient of the controller 1110 using a result of analyzing the sensing current.

The processing unit 1140 calculates a PI control parameter when the controller 1110 is a PI controller, calculates the PID control parameters when the controller 1110 is a PID controller, and may calculate a filter coefficient when a filter is included. The controller 1110 may be an automatic controller, and may be controlled using a combination of P, I, and D.

Here, P means proportional, I means integral, and D means differential. Proportional (P) control is a control that makes the control amount proportional to the difference between the target value and the current position, and as it approaches the target value, the difference of the control values decreases and thus fine control becomes possible. When performing proportional control, when the control amount approaches the target value, the control amount becomes too small and it becomes impossible to finely control it, so that there are residual deviations that remain uncontrollable any more. PI control is a control using proportional and integral, and a residual deviation can be removed by using PI control. Minute residual deviation is accumulated over time to increase the control amount according to the accumulated residual deviation, thereby eliminating the deviation, and since it is a control in which an integral operation is added to a proportional operation, it is called a PI control. In case of PI control, it is possible to control close to the actual target value, but as it approaches the target value, the control amount decreases, and an operation for a certain period of time or longer is required.

At this time, if the integer is large, the response performance may deteriorate when there is an external disturbance. That is, it may be difficult to quickly respond to the external disturbance and it may be difficult to return to the target value. To solve this, a differentiation operation may be performed. By observing the deviation for a sudden disturbance, and if the difference from the previous deviation is large, the manipulated value is increased to respond. Observing the deviation difference from the previous time corresponds to differentiation, and PID control is performed by applying differential to proportional and integral. Even if the control amount deviates from the target value, it is determined as a deviation from the previous time and the target value can be quickly reached by applying the control amount.

The PID control may be expressed as a PID control equation, and the PID control parameters may be expressed as Kp, Ki, and Kd. The PID parameter may be calculated through optimization by using a step response method or a limit reduction method. The PI control may correspond to this, and calculate the PI control parameters Kp and Ki.

The processing unit 1140 may transmit the calculated control parameters to the controller 1110 so that the controller 1110 sets or changes the control parameters of the controller 1110 with the calculated control parameters. The control parameters calculated by the processing unit 1140 is control parameters calculated while the load 1210 is connected. That is, the control parameters that are adaptively calculated by reflecting a characteristic value according to temperature or aging of the load 1210, and corresponds to the optimal control parameters of the controller 1110.

The processing unit 1140 may perform quality determination on the controller 1210 and the control device 1100 or the load 1210 using the result received from the analysis unit 1130. In performing quality determination in the production process, accurate quality determination can be performed by performing quality determination on the controller 1110 in a state in which the load 1210 is connected. The problem that may occur in practical application, in the case when performing quality determination without connecting the controller 1110 and the load 1210, in which quality determination is performed by assuming control parameters for the other part, does not occur in the production equipment according to an embodiment of a second embodiment of the present invention in which the load 1210 is connected to the controller 1110, and the control parameters are measured for the controller 1110 to which the load 1210 is connected. The processing unit 1140 may perform quality determination on the load 1210 as well as the controller 1110. Since the load 1210 is connected to the controller 1110, the processing unit 1140 may perform quality determination on the load 1210 as well as the controller 1110. That is, it may perform quality determination on each of the controller 1110 and the load 1210, or perform quality determination on the controller 1110 and the load 1210 as one set.

The processing unit 1140 may perform quality determination on the controller 1110 or the load 1210 using a result of analyzing the sensing current. Quality determination on the controller 1110 or the load 1210 may be performed on the basis of whether the control parameter according to the result of analyzing the sensing current satisfies the quality determination criterion. The quality determination criterion may have a lower limit and an upper limit, or may be set in a predetermined range having a lower limit or an upper limit. The quality determination criterion is set according to the design specifications of the controller 1110 and the load 1210, or may be set according to safety or safety level, or may be set by a user. The quality determination criterion may be stored in a memory. It may be stored as a lookup table (LUT).

The processing unit 1140 may derive an inductance value L and a resistance value R or an impedance value Z from the result of analyzing the sensing current. Quality determination on the controller 1110 or the load 1210 may be performed using the derived inductance value, resistance value, or impedance value. That is, quality determination on the controller 1110 and the load 1210 may be performed by determining whether it is within the reference range of the inductance value and the resistance value or the impedance value is within the inductance reference range.

The processing unit 1140 not only performs quality determination on the load 1210 using the result of analyzing the sensing current, but also may determine the cause of the failure of the load 1210 when determining that the load 1210 is defective. By determining which failure cause the load 220 is defective, and storing and accumulating the failure cause information, it is possible to know the cause of the defect that frequently occurs during production for the load 1210 at present time, and it is possible to know which defects are occurring at which rate in which production line. That is, the management of the production line or the production system can be performed using the defect cause information.

The processing unit 1140 may derive an inductance value and an impedance value through analysis of the sensing current, and may determine a cause of a failure using the inductance value and the impedance value. At this time, the criteria for determining the cause of failure and classification may vary depending on the type of the load 1210. For example, when the load 1210 is a three-phase motor and the controller 1110 drives the motor using a three-phase power source, the processing unit 1140 may determine disconnection, short circuit, contact resistance increase, magnet demagnetization, coil insulation reduction, and the like as cause of defects.

The processing unit 1140 may calculate the control parameters of the controller 1110 at the same time as the quality determination or after the quality determination. When the controller 1110 and the load 1210 are good products, the control parameters may be calculated in order to set optimal parameters for the controller 1110 in a state in which the load 1210 is connected. When the controller 1110 or the load 1210 is defective, the control parameter calculation may not be performed. Or, the result according to the control parameters set in the current controller 1110 is bad, but when it is determined to be bad within the range that may be determined to be good when the control parameters are changed, the quality determination result for the controller 1110 or the load 1210 may be changed by changing the control parameters thereof. Or, quality determination may be performed again after changing the control parameters. Through this, it may prevent the cases that may be determined to be defective even when they may be determined to be good when the control parameters are changed. When performing individual quality determination on the load 1210 using a fixed control parameter, a case may occur in which a defective determination is made on a load 1210 even though the load 1210 can be used as a good product when the control parameters are changed. However, in the production equipment according to an embodiment of a first embodiment of the present invention, not only performs the quality determination on a controller 1110 to which the load 1210 is connected, but also increases the possibility and accuracy of quality determination on the load 1210 by changing the result for the load 1210 using the change of the control parameters.

The processing unit 1140 may determine whether the load 1210 has failed using a result of analyzing the sensing current. The process of determining whether there is a failure may correspond to the process of performing quality determination. Quality determination is performed in the production process, and failure determination can be performed in the process of controlling a load by being installed in a device or system. The processing unit 1140 may determine whether there is a failure according to the failure determination criterion. The failure determination criterion may be different from the quality determination criterion. The quality determination is a determination for sale, and the failure determination is a determination for whether to stop the operation according to a failure during the current operation, so the failure determination criterion may be weaker than the quality determination criterion. If it is not a fatal failure, it may not be determined as a failure when determining whether there is a failure, even if it is within the range that is determined to be defective during quality determination. That is, the range of criteria determined as normal rather than faulty may be wider than the criteria for determining good products. Or, it is natural that the failure determination criterion may be the same as the quality determination criterion. The failure determination criterion may be set according to the design specifications of the controller 1110 and the load 1210, may be set according to safety or safety grade, or may be set by a user. The failure determination criterion may be stored in the storage unit 1131. It may be stored as a lookup table (LUT).

In addition, the processing unit 1140 may determine not only whether there is a failure, but also a cause of the failure. The load 1210 can determine what cause of the failure caused the failure, and provide the failure cause to the system or the high level controller 1220 through an alarm, so that it can be used to quickly deal with the failure.

Figure 11:
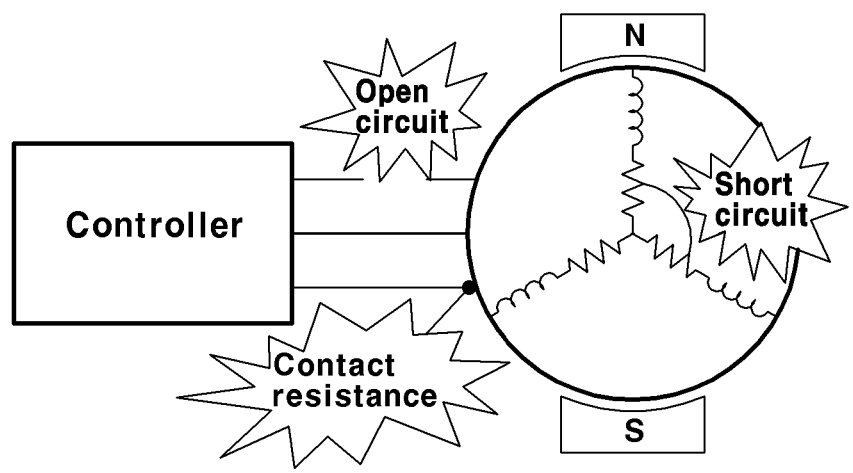
FIGS. 11 to 15 are diagrams for explaining the operation of the control device according to a second embodiment of the present invention.
Figure 12:
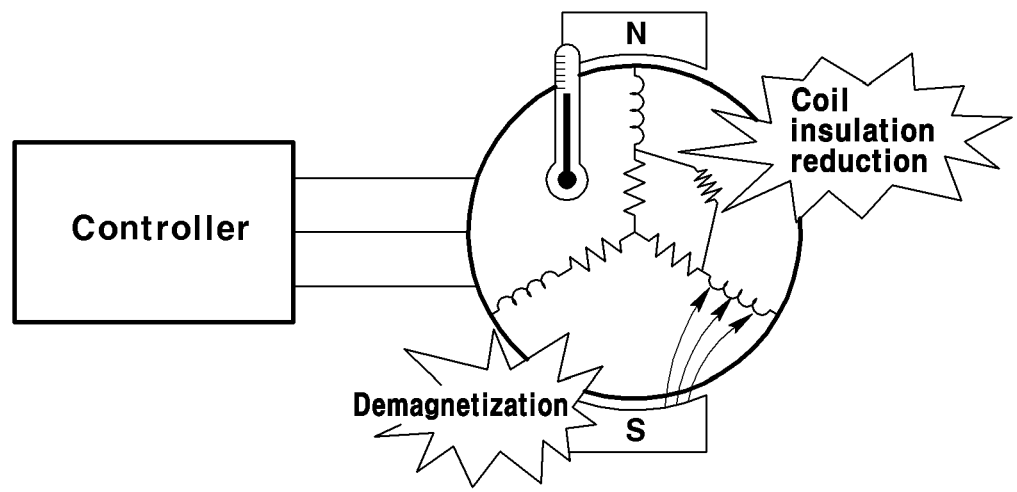

The processing unit 1140 may derive an inductance value and an impedance value through analysis of the sensing current, and may determine a failure cause using the inductance value and the impedance value. At this time, failure cause determination criteria and classification may vary depending on the type of load 1210. For example, when the load 1210 is a three-phase motor and the controller 1110 drives the motor using a three-phase power source, the processing unit 1140 may determine an open circuit, a short circuit, and an increase in contact resistance as the cause of the failure of the load 1210, and as shown in FIG. 11, and may determine the magnetic demagnetization, coil insulation reduction, and the like as shown in FIG. 12. The process of determining the cause of failure may correspond to the process of determining the cause of failure in quality determination.

If the impedance of the phase where the disconnection occurred suddenly decreases to zero, it can be determined that a winding disconnection has occurred. Conversely, if the impedance of the phase in which the short circuit occurs suddenly increases compared to the existing value, it may be determined that a winding short circuit has occurred. In addition, if the resistance of a specific phase among the measured impedances increases, it can be determined as an increase in the contact resistance due to the increased contact resistance for that phase.

When the magnitude of a measured current becomes larger than before at a frequency, a predetermined frequency, for example in a region less than 100 Hz, of the voltage being applied at the same temperature and rotational speed, it can be determined that the magnet is demagnetized. In addition, when the current is large, while the winding temperature increases, and if the inductance measured in a region where the frequency of the applied voltage is 100 Hz or more becomes smaller than the existing value, it can be determined that the magnet is demagnetized. When the resistance and inductance of the coil whose insulation is being reduced progress in a direction in which the insulation is reduced slightly, it can be determined that the insulation reduction of the coil has occurred. In addition, various causes of failure may be determined.

In addition, the processing unit 1140 may estimate the temperatures of the stator and the rotor being included in the load by determining whether the magnetic flux strength, resistance, or inductance of the load changes by using the result of analyzing the sensing current. The load, like a motor, may include a stator and a rotor, and the load including the stator and rotor is greatly affected by temperature. Therefore, in measuring the temperature of the stator and rotor, the result of analyzing the sensing current can be used. The temperature of the stator and rotor can be estimated by determining at least one of a change in the magnetic flux strength of the load, a change in resistance, or a change in inductance by using the result of analyzing the sensing current. In this way, it is possible to determine whether or not a failure occurs or the probability of occurrence of a failure according to the estimated temperature.

The controller is a micro controller unit (MCU), and the sine wave generation unit, analysis unit, and processing unit may be implemented as a processor in the MCU. That is, the sine wave generation unit, the analysis unit, and the processing unit may be implemented as software on a processor included in an MCU embedded in a vehicle or the like, or may be implemented in the form of hardware of a companion chip. When implemented in the form of hardware, it may be formed as one piece of hardware or as separate pieces of hardware.

Figure 13:
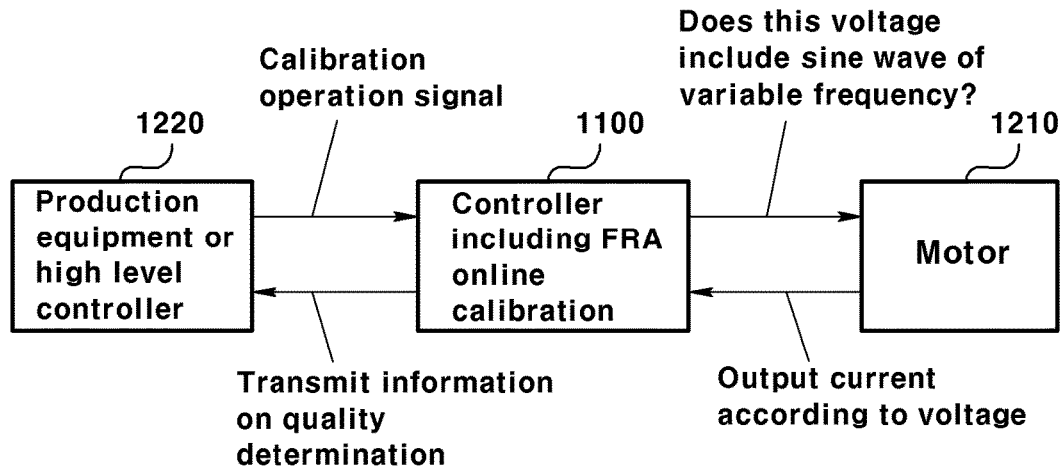
Figure 14:
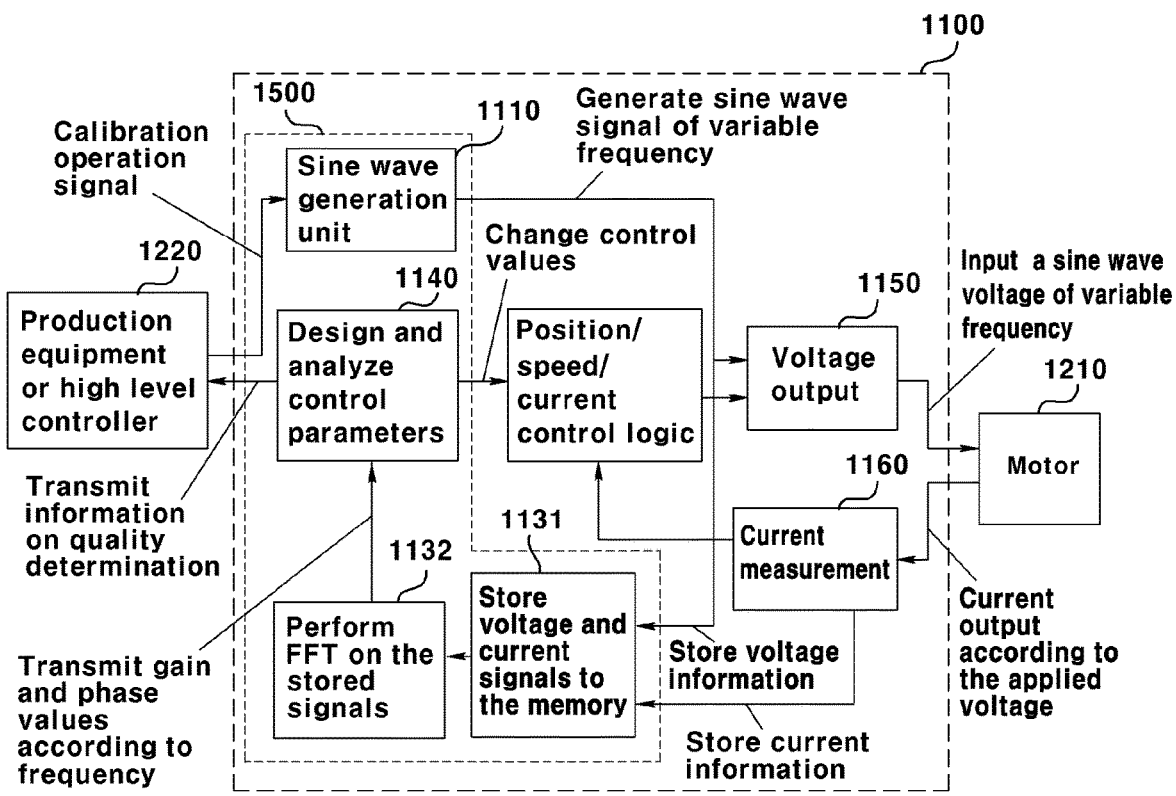

FIGS. 13 and 14 are diagrams for explaining the operation of production equipment according to a second embodiment of the present invention. As shown in FIG. 13, the controller 1100 may be a control device including an FRA online calibration function that drives a motor 1210 serving as a load and performs a frequency response using a variable frequency sine wave. The controller 1100 receives a calibration operation signal from the production device or the high level controller 1220 and applies a voltage including a sine wave of variable frequency to operate the motor 1210. The controller 1100 is connected to the motor 1210, and when the motor is a three-phase motor, three-phase is connected, and in the case of a DC motor, + and − may be connected. When the current according to the voltage applied to the motor 1210 is outputted, quality determination may be performed through frequency response analysis using the sensing current sensed by the current, and control parameters of the controller in the controller 1100 may be set. The quality determination information may be transmitted to the production device or high level controller 1220.

FIG. 14 is a block diagram for each specific function of the controller 1100, may comprise: a position/speed/current control logic that is a controller for driving the motor 1210 that is a load; a voltage output unit 1150; a current measuring unit 1160, and in addition to these, include a sine wave generation unit for detecting the characteristics of the motor 1210 using a sine wave of variable frequency, a voltage and current signal storage memory 1131, an FFT conversion unit 1132 for performing FFT on the stored signal, and an FRA online calibration including a processing unit 1140 that performs design and analysis of control parameters.

When the production device or the high level controller 1220 transmits the calibration operation signal to the sine wave generation unit, the sine wave generation unit generates a sine wave signal of variable frequency, and the voltage output unit 1150 converts a sine wave signal of variable frequency into a voltage along with the control signal being outputted from the position/speed/current control logic to apply a voltage to the motor 1210. Here, the signal of variable frequency should be outputted one cycle or more. For example, if 1 Hz and 10 Hz signals are outputted, after 1 Hz signal is outputted for 1 cycle or more, 10 Hz signal should be outputted for 1 cycle or more. In addition, this variable frequency means a frequency different from the rotation frequency of the motor. For example, when the motor rotates at 600 rpm and the pole pair is 4, the voltage is applied at 40 Hz. However, in the FRA online calibration function, a variable signal including 40 Hz is added and applied. When a current according to the applied voltage is outputted from the motor 1210, the current measuring unit 1160 senses the current, and a fast Fourier transform (FFT) is performed using a pre-stored voltage and current signal according to a sine wave of variable frequency. The stored data is data corresponding to the same frequency, and the number of data of voltage and current is the same. The gain and phase values are calculated through FFT, the gain and phase values according to the frequency are transmitted to the processing unit 1140, the processing unit 1140 designs and analyzes control parameters accordingly to calculate quality determination or control parameters. The quality determination information is transmitted to the production device or the high level controller 1220, and the control value of the position/speed/current control logic is changed using the calculated control parameters. Through this, it is possible to perform quality determination in a state in which the motor, the controller, and the controller and the motor are connected. In addition, it is possible to measure the controller stability (phase margin, gain margin) in the frequency domain. In addition, it is possible to design the optimal controller value (P, I, D, gain, and filter) by analyzing the characteristics of the desired frequency through the sine wave generation unit inside the control device. In addition, even if the motor characteristics change as the motor usage environment (temperature, aging, and the like) changes, the motor characteristics are measured online to obtain the optimum control values, the control performance (ripple in steady state, responsiveness in transient, and the like) can always be kept optimal.

Figure 15:
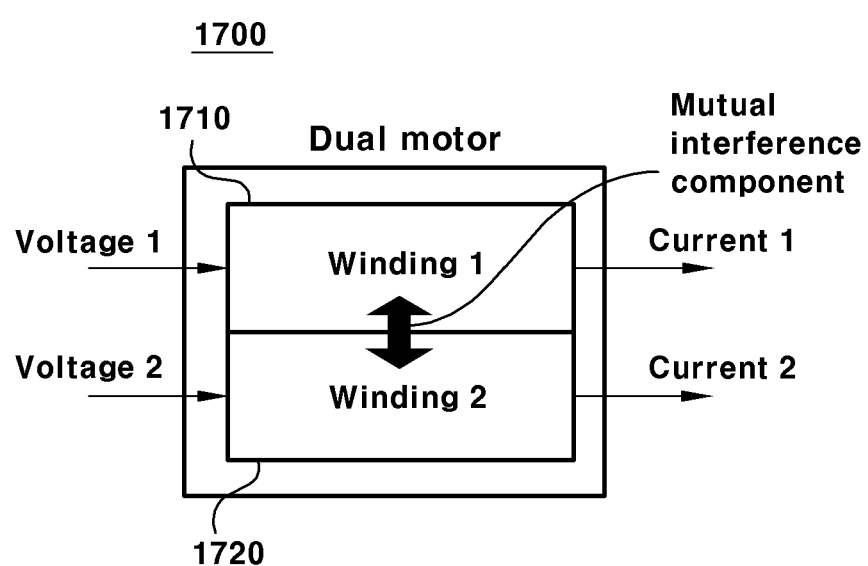

In addition, the mutual interference component for the dual motor 1700 of FIG. 15 may be measured by using a sine wave generation unit. Sine waves having different frequencies are applied to different motors 1710 and 720, respectively, and the mutual interference components of the two motors 1710 and 720 can be calculated through frequency response analysis according to the currents being outputted, respectively. Through this, it is possible to accurately compensate the mutual interference component by calculating an accurate mutual interference component.

Figure 16:
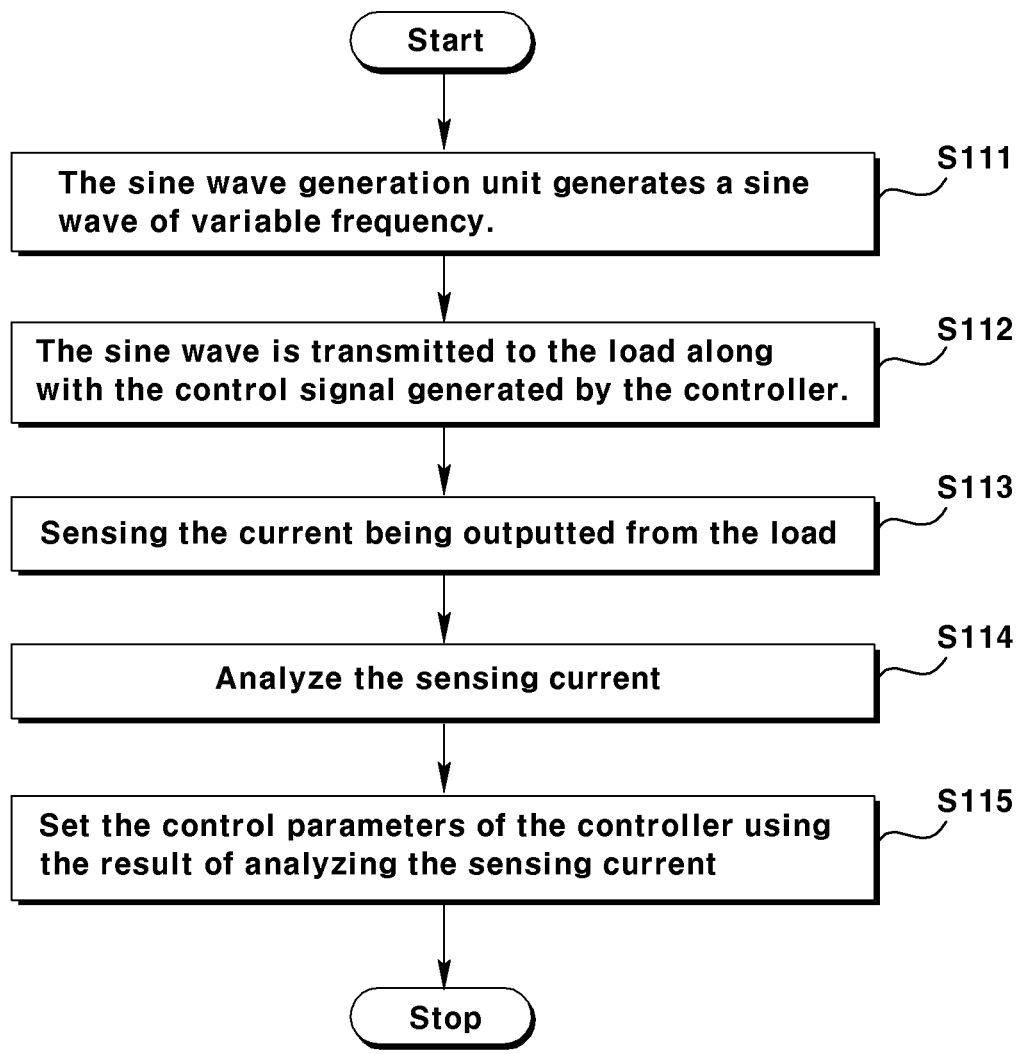
FIG. 16 is a flowchart of a control parameter setting method according to an embodiment of a second embodiment of the present invention.
Figure 17:
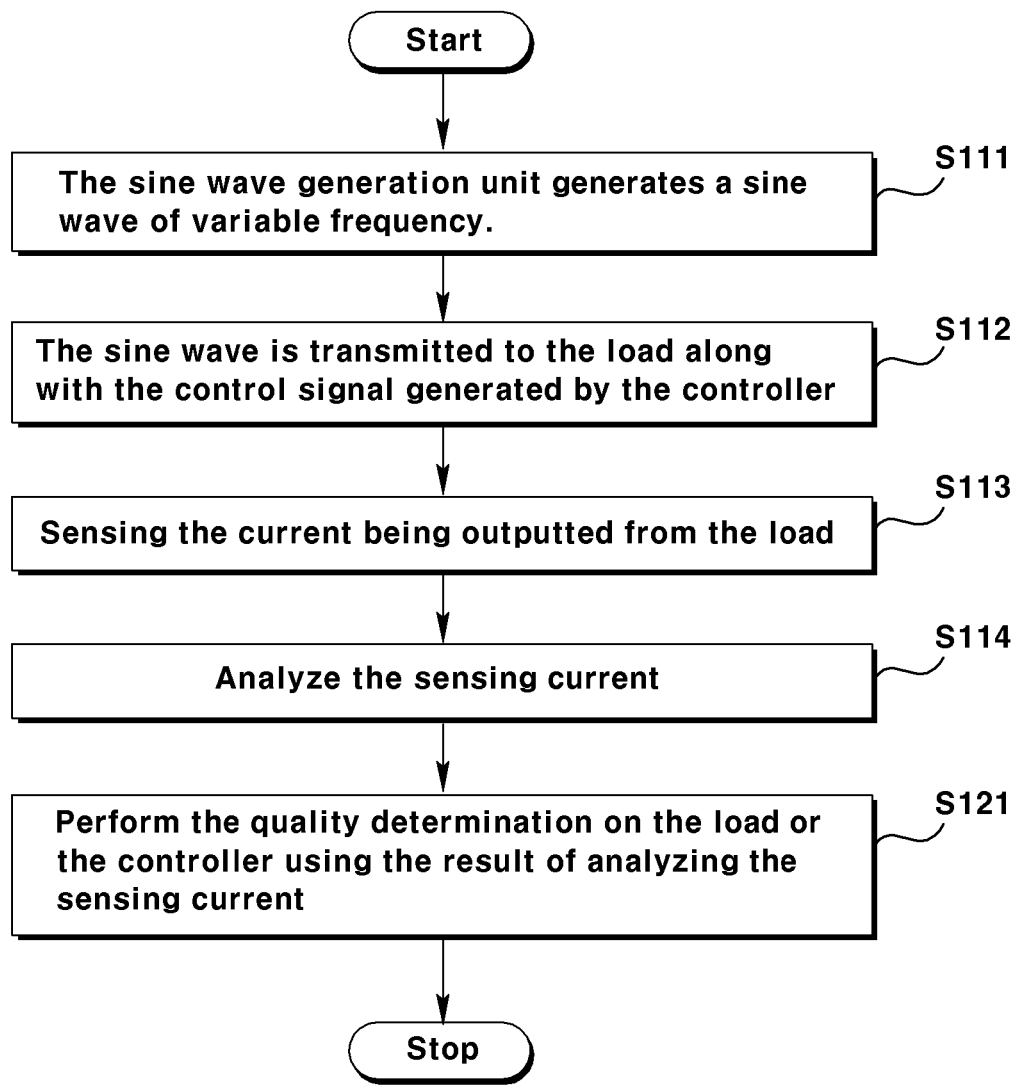
FIGS. 17 to 19 are flowcharts of a control parameter setting method according to another embodiment of a second embodiment of the present invention.
Figure 18:
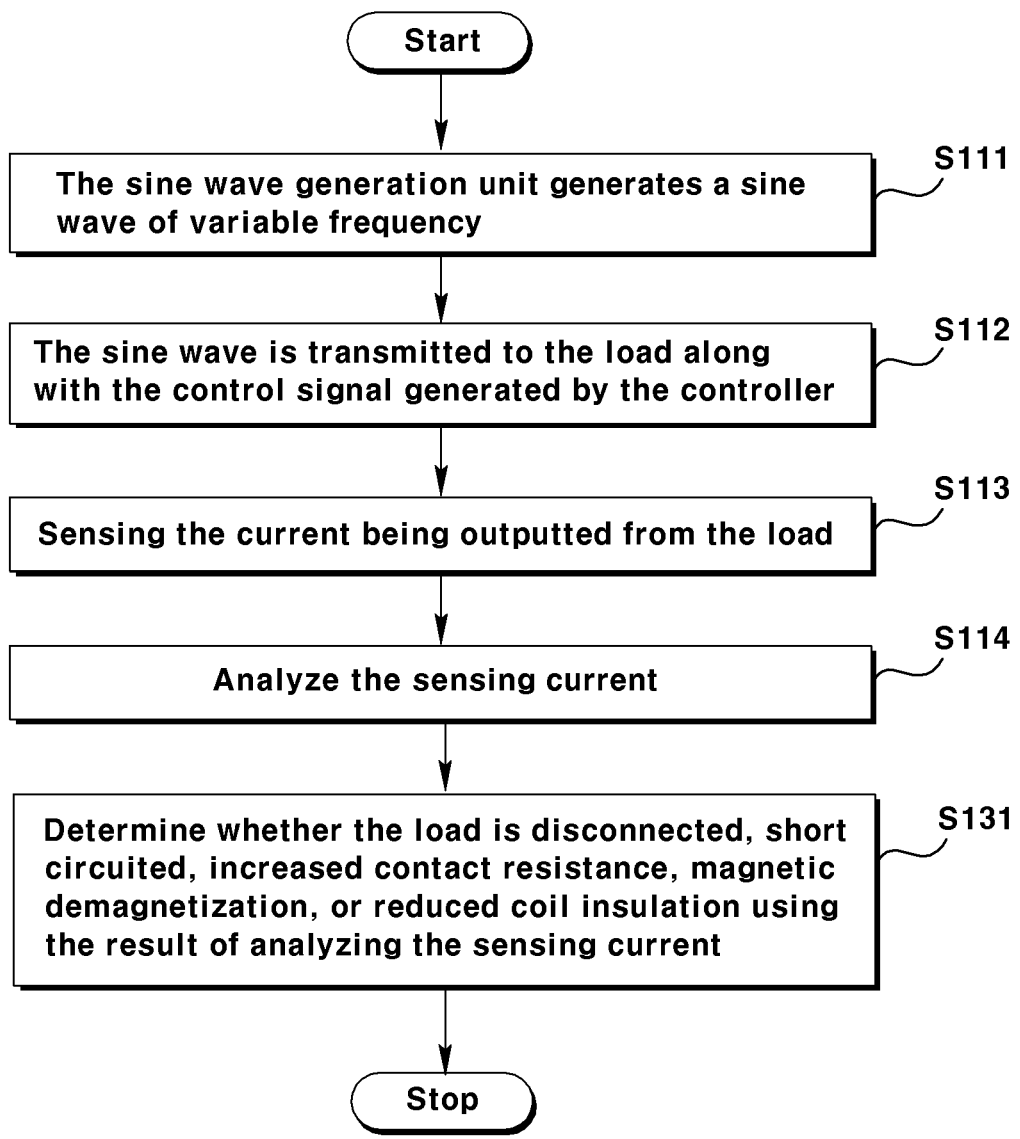
Figure 19:
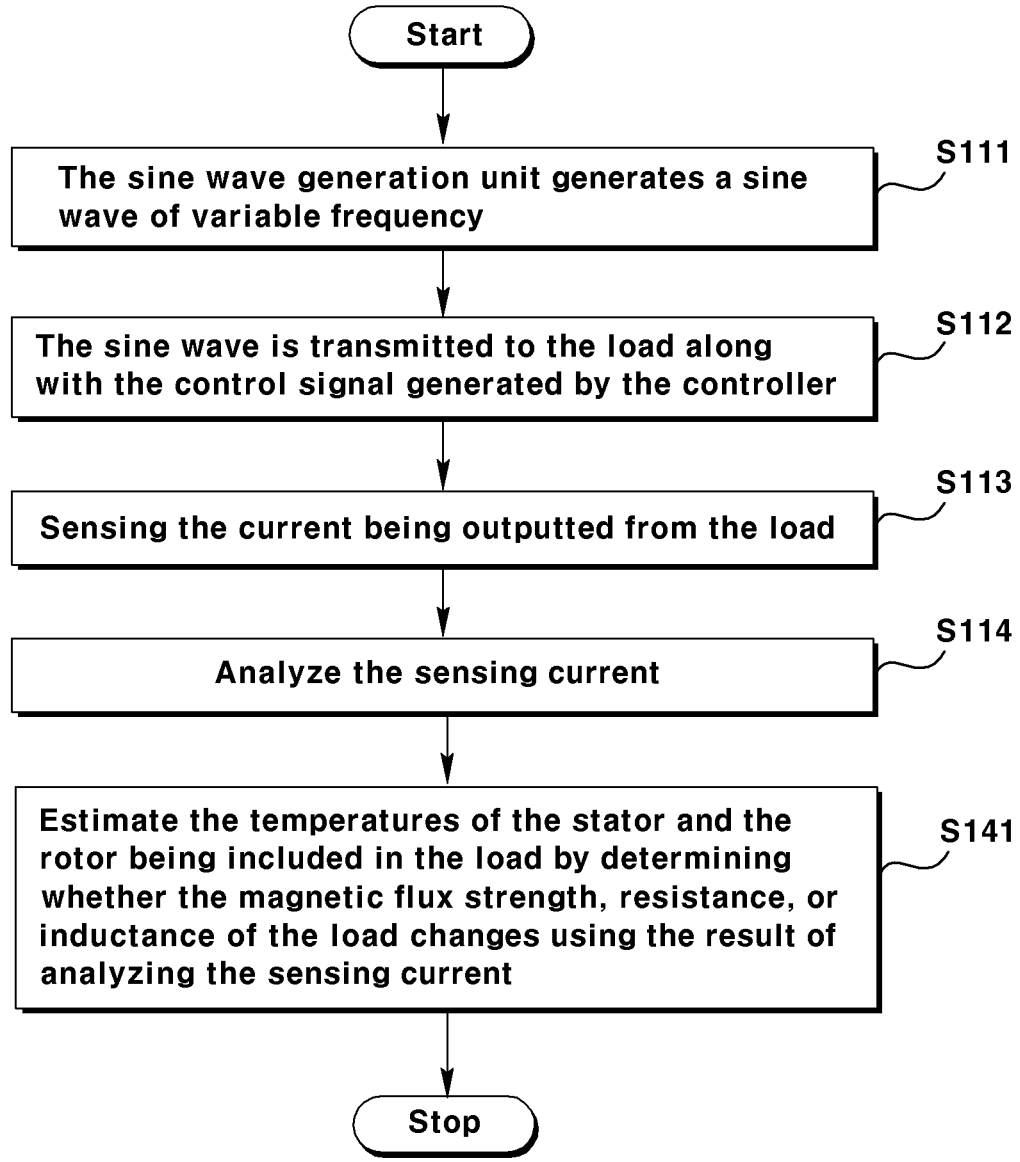

FIG. 16 is a flowchart of a control parameter setting method according to an embodiment of a second embodiment of the present invention; and FIGS. 17 to 19 are flowcharts of a control parameter setting method according to another embodiment of a second embodiment of the present invention. A detailed description of each step of FIGS. 16 to 19 corresponds to a detailed description of a method for setting a control parameter in the control device of FIGS. 8 to 15, and an overlapped description will be omitted below.

In step S11, the sine wave generation unit generates a sine wave of variable frequency, and in step S12, the sine wave is transmitted to the load together with the control signal generated by the controller. Thereafter, the current being outputted from the load is sensed in step S13, and the sensed sensing current is analyzed in step S14. In analyzing the sensing current, a fast Fourier transform may be performed using the sine wave and the sensing current.

Then, in step S15, control parameters of the controller are set using the result of analyzing the sensing current in step S14.

In setting the parameters of the controller, the control parameters of the controller may be set using the inductance and impedance of the load being derived from the analysis result of the sensing current.

In addition, in step S21, quality determination on the load or the controller may be performed using the result of analyzing the sensing current in step S14.

In generating the sine wave, the sine wave may be generated by receiving a mode operation signal from the controller, a production device, or a high level controller, or the sine wave may be generated periodically, and the frequency of the sine wave may be different from the control signal and frequency of the controller.

In addition, in analyzing the sensed sensing current, in step S31, it may be determined whether the load is disconnected, short circuited, increased contact resistance, magnetic demagnetization, or reduced coil insulation using the result of analyzing the sensing current in step S14.

In addition, in analyzing the sensed sensing current, in step S41, the temperatures of the stator and rotor being included in the load can be estimated by determining whether the magnetic flux strength, resistance, or inductance of the load changes by using the result of analyzing the sensing current in step S14.

The control parameter setting method according to a second embodiment of the present invention may be performed in a processor of an embedded controller (MCU) formed in a vehicle or the like. That is, by using the frequency response analysis (FRA), it is possible to find the optimal control parameters (PID/PI/filter coefficients). By using frequency response analysis, it is possible to find the optimal control parameters (PID/PI/filter coefficients) in real time or periodically on the online (or runtime) during vehicle operation.

A modified embodiment according to the present embodiment may include some configurations of a first embodiment and some configurations of a second embodiment together. That is, the modified embodiment may include the first embodiment, but some configurations of the first embodiment may be omitted, and may include some configurations of the corresponding second embodiment. Or, the modified embodiment may include the second embodiment, but some configurations of the second embodiment are omitted and include some configurations of the corresponding first embodiment.

Features, structures, effects, and the like described in the above embodiments are included in at least one embodiment, and are not necessarily limited to only one embodiment. Furthermore, features, structures, effects, and the like illustrated in each embodiment can be combined or modified for other embodiments by those of ordinary skill in the art to which the embodiments belong. Accordingly, the contents related to such combinations and modifications should be interpreted as being included in the scope of the embodiments.

Meanwhile, the embodiments of the present invention can be implemented as computer-readable codes on a computer-readable recording medium. The computer-readable recording medium includes all types of recording devices in which data readable by a computer system is stored.

As examples of computer-readable recording media there are ROM, RAM, CD-ROM, magnetic tape, floppy disk, and optical data storage devices, and in addition, they are distributed across networked computer systems in a distributed manner in which computer-readable code can be stored and executed. And functional programs, codes, and code segments for implementing the present invention can be easily inferred by programmers in the technical field to which the present invention belongs.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. A production equipment for performing quality determination on a controller, the production equipment comprising:
   a frequency response analysis unit that transmits a sine wave of variable frequency to a controller connected to a load, receives a sensing current sensing a current outputted from the load to which the sine wave is applied from the controller, and analyzes the received sensing current; and
   a processing unit that receives a result of analyzing the sensing current from the frequency response analysis unit to perform quality determination on the controller.

2. The production equipment according to claim 1, wherein the frequency response analysis unit analyzes the received sensing current by performing a fast Fourier transform.

3. The production equipment according to claim 1, wherein the frequency response analysis unit performs a fast Fourier transform using the received sensing current and a sine wave transmitted to the controller.

4. The production equipment according to claim 1, wherein the sine wave is a sine wave with a variable frequency, and a signal having one of the variable frequencies is outputted for one cycle or more, or a signal with a continuously changing frequency is outputted for one cycle or more.

5. The production equipment according to claim 1, wherein the controller receives a sine wave from the frequency response analysis unit, converts it into a voltage signal, and applies it to the load.

6. The production equipment according to claim 1, wherein the processing unit performs quality determination on the controller or the load using a result of analyzing the sensing current.

7. The production equipment according to claim 1, wherein the processing unit determines the cause of the failure of the load using the result of analyzing the sensing current.

8. The production equipment according to claim 1, wherein the processing unit calculates a PI control parameter, a PID control parameter, or a filter coefficient of the controller using the result of analyzing the sensing current.

9. The production equipment according to claim 1, wherein the processing unit controls the frequency response analysis unit by transmitting a mode entry signal to the frequency response analysis unit.

10. The production equipment according to claim 1, wherein the frequency response analysis unit transmits the sine wave to the controller using communication or a digital analog converter (DAC).

11. The production equipment according to claim 1, wherein the load comprises an actuator.

12. A production method for performing quality determination on a controller, the production method comprising the steps of:
   transmitting a mode entry signal to a frequency response analysis unit;
   generating a sine wave of variable frequency by the frequency response analysis unit and transmitting it to a controller connected to a load;
   receiving, from the controller, a sensing current sensing the current outputted from the load to which the sine wave is applied;
   analyzing the received sensing current by the frequency response analysis unit;
   receiving a result of analyzing the sensing current from the frequency response analysis unit; and
   performing quality determination on the controller or the load using the result of analyzing the sensing current.

13. The production method according to claim 12, wherein the step of analyzing the received sensing current analyzes by performing fast Fourier transform using the received sensing current and a sine wave transmitted to the controller.

14. The production method according to claim 12, wherein the sine wave is a sine wave with a variable frequency, and a signal having one of the variable frequencies is outputted for one cycle or more, or a signal with a continuously changing frequency is outputted for one cycle or more.

15. The production method according to claim 12, comprising:
   calculating control parameters of the controller by calculating a PI control parameter, a PID control parameter, or a filter coefficient of the controller using a result of analyzing the sensing current.

16. The production method according to claim 12, wherein the step of performing the quality determination on the controller or the load determines a cause of a failure of the load using the result of analyzing the sensing current.

* * * * *